(12) United States Patent
Liu et al.

(10) Patent No.: US 12,035,267 B2
(45) Date of Patent: Jul. 9, 2024

(54) TIMING ADVANCE UPDATE METHOD AND DEVICE FOR UPLINK TRANSMISSION IN WIRELESS COMMUNICATION

(71) Applicant: Huawei Technologies Co., Ltd., Shenzhen (CN)

(72) Inventors: Peng Liu, Shenzhen (CN); Jun Chen, Dongguan (CN); Jingjing Huang, Shenzhen (CN); Guangjian Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 286 days.

(21) Appl. No.: 17/390,317

(22) Filed: Jul. 30, 2021

(65) Prior Publication Data

US 2021/0360556 A1 Nov. 18, 2021

Related U.S. Application Data

(63) Continuation of application No. PCT/CN2019/130763, filed on Dec. 31, 2019.

(30) Foreign Application Priority Data

Feb. 1, 2019 (CN) .......................... 201910105796.X

(51) Int. Cl.
*H04W 56/00* (2009.01)
*H04W 84/06* (2009.01)

(52) U.S. Cl.
CPC ....... *H04W 56/005* (2013.01); *H04W 56/001* (2013.01); *H04W 84/06* (2013.01)

(58) Field of Classification Search
CPC . H04W 56/005; H04W 56/001; H04W 84/06; H04W 72/0446; H04W 56/0015;
(Continued)

(56) References Cited

U.S. PATENT DOCUMENTS

| 2011/0051633 A1 | 3/2011 | Pan et al. |
| 2012/0014371 A1 | 1/2012 | Weng et al. |

(Continued)

FOREIGN PATENT DOCUMENTS

| CN | 101572577 A | 11/2009 |
| CN | 107197517 A | 9/2017 |

(Continued)

OTHER PUBLICATIONS

Thales, Fraunhofer IIS, "NR-NTN: Analysis of the applicability of NR numerology to satellite," RP-172277, 3GPP TSG RAN Plenary Meeting #78, Lisbon, Portugal, Dec. 18-21, 2017, 26 pages.

(Continued)

*Primary Examiner* — Rushil P. Sampat
(74) *Attorney, Agent, or Firm* — Conley Rose, P.C.

(57) ABSTRACT

A timing advance update method and device, where the method includes: A terminal obtains a transmission delay variation, where the transmission delay variation is a delay variation of transmission between the terminal and a network device; the terminal determines a new timing advance based on the transmission delay variation, a current timing advance, and a timing advance critical value, where the timing advance of the terminal is not greater than the timing advance critical value; and the terminal performs uplink transmission based on the new timing advance.

17 Claims, 13 Drawing Sheets

(58) Field of Classification Search
CPC ........... H04W 56/0045; H04W 72/042; H04W 72/1268; H04W 72/23; H04W 76/27; H04W 88/02; H04L 1/1812
See application file for complete search history.

(56) References Cited

U.S. PATENT DOCUMENTS

| | | | |
|---|---|---|---|
| 2017/0303224 A1 | 10/2017 | Choi et al. | |
| 2018/0084546 A1* | 3/2018 | Guo | H04W 56/0045 |
| 2019/0098601 A1* | 3/2019 | Kumar | H04W 72/563 |
| 2019/0191403 A1* | 6/2019 | Goel | H04L 27/2695 |
| 2019/0373592 A1 | 12/2019 | Ji et al. | |
| 2020/0053682 A1* | 2/2020 | Abedini | H04W 56/0025 |
| 2020/0107348 A1 | 4/2020 | Park et al. | |
| 2020/0337011 A1* | 10/2020 | Jiang | H04W 56/0015 |

FOREIGN PATENT DOCUMENTS

| | | |
|---|---|---|
| CN | 107333241 A | 11/2017 |
| CN | 108282198 A | 7/2018 |
| EP | 3018938 A1 | 5/2016 |
| WO | 2018147672 A1 | 8/2018 |

OTHER PUBLICATIONS

LG Electronics, "D2D Discovery Signal Format, 3GPP TSG RAN WG1 Meeting #74bis," R1-134415, Guangzhou, China, Oct. 7-11, 2013, 8 pages.

3rd Generation Partnership Project; Technical Specification Group Radio Access Network;NR; Physical channels and modulation (Release 15), 3GPP TS 38.211 V15.4.0, Dec. 2018, 96 pages.

Hisense, "Considerations on transmission in preconfigured UL resources," 3GPP TSG RAN WG1 Meeting #94bis, R1-1810180 , Chengdu , China, Oct. 8-12, 2018, 4 pages.

* cited by examiner

TIMING ADVANCE UPDATE METHOD AND DEVICE FOR UPLINK TRANSMISSION IN WIRELESS COMMUNICATION

CROSS-REFERENCE TO RELATED APPLICATIONS

This application is a continuation of International Patent Application No. PCT/CN2019/130763, filed on Dec. 31, 2019, which claims priority to Chinese Patent Application No. 201910105796.X, filed on Feb. 1, 2019. The disclosures of the aforementioned applications are hereby incorporated by reference in their entireties.

TECHNICAL FIELD

Embodiments of this application relate to the field of communications technologies, and in particular, to a timing advance update method and device.

BACKGROUND

In an existing communications system, delays of uplink transmissions from different terminals in a same cell to a receive end may be different. Therefore, an uplink synchronization technology needs to be used, so that times at which uplink transmissions of terminals arrive at the receive end are almost the same, to ensure that there is no interference between the terminals. The receive end may be a network device such as a base station.

In a current technology, uplink synchronization is implemented using a timing advance (TA). The timing advance is determined based on a round-trip delay between a terminal and a base station, and there are two procedures for the timing advance: determining an initial timing advance; and updating the timing advance. In a random access process, a base station determines an initial timing advance based on a random access preamble sent by a terminal, and sends, to the terminal, a random access response carrying the initial timing advance. However, as a distance between the terminal and the base station changes, the initial timing advance is no longer applicable, and the timing advance needs to be updated. When the timing advance of the terminal needs to be adjusted, the base station sends a timing advance command to the terminal, where the timing advance command includes adjustment information. Then the terminal updates the timing advance based on the adjustment information.

In a mobile satellite system, due to high-speed movement of a satellite, a distance between a terminal and the satellite is constantly changing. Therefore, the terminal needs to constantly update a timing advance. However, a round-trip delay between the terminal and the satellite varies greatly. If a timing advance update method in the existing communications system is used, update efficiency is relatively low.

SUMMARY

Embodiments of this application provide a timing advance update method and device, to improve update efficiency of a timing advance.

According to a first aspect, an embodiment of this application provides a timing advance update method, including the following.

A terminal obtains a transmission delay variation, where the transmission delay variation is a delay variation of transmission between the terminal and a network device. The transmission delay variation is a variation of a round-trip transmission delay between the terminal and the network device. The variation may be understood as a variation between a current round-trip transmission delay and a previous round-trip transmission delay.

The terminal determines a new timing advance based on the transmission delay variation, a current timing advance, and a timing advance critical value, where the timing advance of the terminal is not greater than the timing advance critical value. In other words, the new timing advance of the terminal is not greater than the timing advance critical value. The timing advance critical value may be a critical value in a time unit of a subframe, a slot, a symbol, or the like. Alternatively, the timing advance critical value may be a critical value in a time unit of a millisecond, a microsecond, or the like.

The terminal performs uplink transmission based on the new timing advance. To be more specific, after the terminal determines the new timing advance, the terminal may update the new timing advance by itself. Because the new timing advance is actively updated by the terminal, the new timing advance does not need to be determined based on a timing advance command sent by the network device. As such, update efficiency of the timing advance is improved.

In a possible design, that the terminal determines a new timing advance based on the transmission delay variation, a current timing advance, and a timing advance critical value includes: The terminal determines a candidate timing advance based on the transmission delay variation and the current timing advance; and the terminal determines the new timing advance based on the candidate timing advance and the timing advance critical value.

The terminal may determine the candidate timing advance according to $TA_{new}=TA_{old}+\Delta RTD$, where $\Delta RTD$ is the transmission delay variation, $TA_{old}$ is the current timing advance, and $TA_{new}$ is the candidate timing advance. The new timing advance is determined based on the candidate timing advance and the timing advance critical value, to prevent the candidate timing advance from being greater than the timing advance critical value, thereby ensuring normal data transmission of the terminal.

In a possible design, that the terminal determines the new timing advance based on the candidate timing advance and the timing advance critical value includes: if the candidate timing advance is greater than the timing advance critical value, the new timing advance is determined based on a difference between the candidate timing advance and the timing advance critical value; or if the candidate timing advance is not greater than the timing advance critical value, the candidate timing advance is used as the new timing advance.

The new timing advance may be determined based on the candidate timing advance and the timing advance critical value, such that the terminal can update the timing advance by itself, thereby improving update efficiency of the timing advance. When the candidate timing advance is greater than the timing advance critical value, the new timing advance is determined based on the difference between the candidate timing advance and the timing advance critical value. The timing advance continuously updated by the terminal is always within one slot, and does not occupy more slots. As such, resources on a terminal side are saved, and it is ensured that uplink transmission of the terminal does not interfere with other operation of the terminal.

In a possible design, that a terminal obtains a transmission delay variation includes: The terminal obtains a first receiving time of a current downlink signal and a second receiving time of a previous downlink signal, where the downlink signal is a signal periodically sent by the network device; and the terminal determines the transmission delay variation based on the first receiving time, the second receiving time, and a sending periodicity of the downlink signal.

In a possible design, the downlink signal is one of the following: a primary synchronization signal, a secondary synchronization signal, or a pilot signal.

The terminal can quickly and accurately determine the transmission delay variation by receiving the downlink signal periodically sent by the network device.

In a possible design, the method further includes: The terminal receives a timing advance command sent by the network device, where the timing advance command indicates a timing advance update amount, and where the timing advance update amount indicated by the timing advance command is not greater than the timing advance critical value; and the terminal determines the new timing advance based on the timing advance command and the current timing advance.

When a change in the round-trip transmission delay exactly exceeds a critical point of two slots, the terminal receives the timing advance command sent by the network device, and determines the new timing advance based on the timing advance command. As such, an accurate timing advance can be obtained under a critical condition.

In a possible design, the timing advance critical value is an integer multiple of a slot length. Because the timing advance critical value is the integer multiple of the slot length, that is, provided that the timing advance does not exceed the timing advance critical value, the timing advance may be updated through one update. Thus, the timing advance does not need to be updated for a plurality of times, thereby improving update efficiency of the timing advance.

In a possible design, the network device is a satellite.

According to a second aspect, an embodiment of this application provides a timing advance update method, including the following.

A network device obtains a transmission delay variation and a candidate timing advance update amount of a terminal, where the transmission delay variation is a delay variation of transmission between the terminal and the network device. The candidate timing advance update amount may be determined based on uplink transmission of the terminal.

The network device determines a timing advance update amount of the terminal based on the transmission delay variation, the candidate timing advance update amount, and a timing advance critical value, where the timing advance update amount is not greater than the timing advance critical value.

The network device sends a timing advance command to the terminal, where the timing advance command indicates the timing advance update amount.

In a possible design, that the network device determines a timing advance update amount of the terminal based on the transmission delay variation, the candidate timing advance update amount, and a timing advance critical value includes: If a difference between the transmission delay variation and the candidate timing advance update amount is equal to the timing advance critical value, that is, a critical condition of a system $\Delta TA = \Delta RTD \pm T_S$ is met, the candidate timing advance update amount is determined as the timing advance update amount of the terminal, where $\Delta TA$ is a timing advance variation, $\Delta RTD$ is a round-trip transmission delay variation, and $\pm T_S$ is the timing advance critical value. Herein, an example in which the timing advance critical value is one slot is used for description. The timing advance continuously updated by the terminal is always within one slot, and does not occupy more slots, such that resources on a terminal side are saved, and it is ensured that uplink transmission of the terminal does not interfere with another operation of the terminal.

In a possible design, the network device is a satellite, and that a network device obtains a transmission delay variation includes: The satellite determines the transmission delay variation based on a correspondence between a transmission delay and an elevation angle.

In a possible design, the timing advance critical value is an integer multiple of a slot length.

In a possible design, the timing advance critical value is one slot, and a length of the timing advance command is 12 bits.

According to a third aspect, an embodiment of this application provides a timing advance update apparatus, including: a receiving module configured to obtain a transmission delay variation, where the transmission delay variation is a delay variation of transmission between a terminal and a network device; a processing module configured to determine a new timing advance based on the transmission delay variation, a current timing advance, and a timing advance critical value, where the timing advance of the terminal is not greater than the timing advance critical value; and a sending module configured to perform uplink transmission based on the new timing advance.

In a possible design, the processing module is further configured to: determine, a candidate timing advance based on the transmission delay variation and the current timing advance; and determine, the new timing advance based on the candidate timing advance and the timing advance critical value.

In a possible design, the processing module is further configured to: if the candidate timing advance is greater than the timing advance critical value, determine the new timing advance based on a difference between the candidate timing advance and the timing advance critical value; or if the candidate timing advance is not greater than the timing advance critical value, use the candidate timing advance as the new timing advance.

In a possible design, the receiving module is configured to: obtain, a first receiving time of a current downlink signal and a second receiving time of a previous downlink signal, where the downlink signal is a signal periodically sent by the network device; and determine, the transmission delay variation based on the first receiving time, the second receiving time, and a sending periodicity of the downlink signal.

In a possible design, the downlink signal is one of the following: a primary synchronization signal, a secondary synchronization signal, or a pilot signal.

In a possible design, the receiving module is further configured to receive a timing advance command sent by the network device, where the timing advance command indicates a timing advance update amount, and where the timing advance update amount indicated by the timing advance command is not greater than the timing advance critical value.

The processing module is further configured to determine the new timing advance based on the timing advance command and the current timing advance.

In a possible design, the timing advance critical value is an integer multiple of a slot length.

In a possible design, the network device is a satellite.

According to a fourth aspect, an embodiment of this application provides a timing advance update apparatus, including: a processing module configured to obtain a transmission delay variation and a candidate timing advance update amount of a terminal, where the transmission delay variation is a delay variation of transmission between the terminal and a network device, where the processing module is further configured to determine a timing advance update amount of the terminal based on the transmission delay variation, the candidate timing advance update amount, and a timing advance critical value, where the timing advance update amount is not greater than the timing advance critical value; and a sending module configured to send a timing advance command to the terminal, where the timing advance command indicates the timing advance update amount.

In a possible design, the processing module is further configured to: if a difference between the transmission delay variation and the candidate timing advance update amount is equal to the timing advance critical value, determine the candidate timing advance update amount as the timing advance update amount of the terminal.

In a possible design, the processing module is further configured to: determine, by the satellite, the transmission delay variation based on a correspondence between a transmission delay and an elevation angle.

In a possible design, the timing advance critical value is an integer multiple of a slot length.

In a possible design, the timing advance critical value is one slot, and a length of the timing advance command is 12 bits.

According to a fifth aspect, an embodiment of this application provides a terminal, including a memory, a processor, and a computer program. The computer program is stored in the memory, and the processor runs the computer program to perform the method according to the first aspect or the possible designs of the first aspect.

According to a sixth aspect, an embodiment of this application provides a storage medium. The storage medium includes a computer program, and the computer program is used for implementing the method according to the first aspect or the possible designs of the first aspect.

According to a seventh aspect, an embodiment of this application provides a computer program product. The computer program product includes computer program code, and when the computer program code is run on a computer, the computer is enabled to perform the method according to the first aspect or the possible designs of the first aspect.

According to an eighth aspect, an embodiment of this application provides a chip, including a memory and a processor. The memory is configured to store a computer program, and the processor is configured to invoke the computer program from the memory and run the computer program, such that a communications device on which the chip is installed performs the method according to the first aspect or the possible designs of the first aspect.

According to a ninth aspect, an embodiment of this application provides a network device, including a memory, a processor, and a computer program. The computer program is stored in the memory, and the processor runs the computer program to perform the method according to the second aspect or the possible designs of the second aspect.

According to a tenth aspect, an embodiment of this application provides a storage medium. The storage medium includes a computer program, and the computer program is used for implementing the method according to the second aspect or the possible designs of the second aspect.

According to an eleventh aspect, an embodiment of this application provides a computer program product. The computer program product includes computer program code, and when the computer program code is run on a computer, the computer is enabled to perform the method according to the second aspect or the possible designs of the second aspect.

According to a twelfth aspect, an embodiment of this application provides a chip, including a memory and a processor. The memory is configured to store a computer program, and the processor is configured to invoke the computer program from the memory and run the computer program, such that a communications device on which the chip is installed performs the method according to the second aspect or the possible designs of the second aspect.

According to the timing advance update method and device provided in the embodiments, in the method, the terminal obtains the transmission delay variation, and the terminal can actively determine the new timing advance based on the transmission delay variation, the current timing advance, and the timing advance critical value, where the timing advance of the terminal is not greater than the timing advance critical value. The terminal performs uplink transmission based on the new timing advance. Because the new timing advance is actively updated by the terminal, the new timing advance does not need to be determined based on the timing advance command sent by the network device, thereby improving update efficiency of the timing advance.

According to the timing advance update method and the device provided in the embodiments, in the method, the network device obtains the transmission delay variation and the candidate timing advance update amount of the terminal, and the network device determines the timing advance update amount of the terminal based on the transmission delay variation, the candidate timing advance update amount, and the timing advance critical value. The network device sends, to the terminal, the timing advance command used to indicate the timing advance update amount. Because the timing advance critical value is set, a range of the timing advance update amount is extended, and efficiency of updating the timing advance of the terminal by the network device is improved.

DESCRIPTION OF EMBODIMENTS

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may learn that: With evolution of the network architecture and emergence of new service scenarios, the technical solutions provided in the embodiments of this application are also applicable to similar technical problems.

Figure 1:
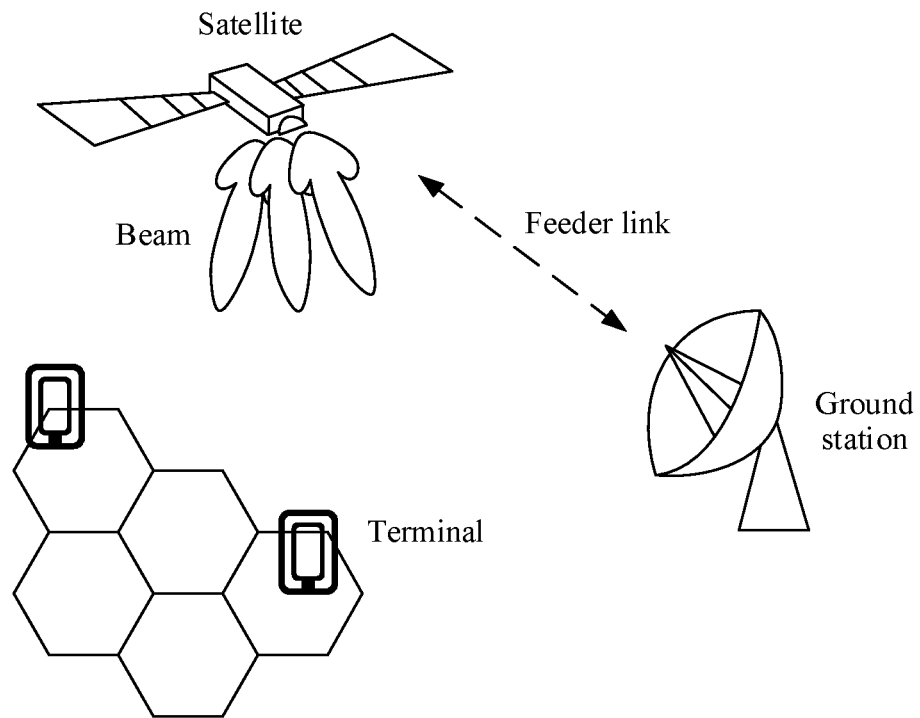
FIG. 1 is a schematic architectural diagram of a satellite mobile communications system according to an embodiment of this application.

FIG. 1 is a schematic architectural diagram of a satellite mobile communications system according to an embodiment of this application. The satellite mobile communications system includes a satellite, a terminal, and a ground station. As an access point of a ground terminal, the satellite is similar to a network device in a ground mobile communications system, and the satellite provides a wide-area coverage communications service for the ground terminal. The satellite communicates with the terminal using a radio signal. A communications protocol may be any one of terrestrial mobile communications protocols or a variant of the terrestrial mobile communications protocol. The communications protocol may be, for example, a Long-Term Evolution (LTE) protocol or a new radio (NR) protocol. A specific communications protocol is not specifically limited in this embodiment. The satellite usually forms a plurality of beams, and each beam is similar to a cell or a sector in a terrestrial mobile communications system. The satellite is also wirelessly connected to the ground station. The link is usually referred to as a feeder link and provides data backhaul. There may also be an inter-satellite link between satellites for providing data backhaul.

In the embodiments, the terminal may be a wireless terminal. The wireless terminal may refer to a device that provides a user with voice and/or other service data connectivity, a handheld device with a wireless connection function, or the like. The wireless terminal may be a mobile terminal, for example, a mobile phone (or referred to as a "cellular" phone); a computer having a mobile terminal, for example, may be a portable, pocket-sized, handheld, computer built-in, or vehicle-mounted mobile apparatus; and the like. An implementation of the wireless terminal is not particularly limited in this embodiment.

In the satellite mobile communications system, delays for terminals located in a same cell to arrive at a satellite may be different. Therefore, an uplink synchronization technology needs to be used, such that times at which different terminals arrive at the satellite are almost the same, to ensure that there is no interference between the terminals. The uplink synchronization technology is mainly used for the terminal to perform uplink transmission based on a timing advance, and timing advances of different terminals may be different based on distances between the terminals and satellite.

In a new radio (NR) or LTE communications system, there are two procedures for the timing advance: determining an initial timing advance; and updating the timing advance. In a random access process, a base station determines an initial timing advance based on a random access preamble sent by a terminal, and sends, to the terminal, a random access response carrying the initial timing advance.

However, as a distance between the terminal and the base station changes, the initial timing advance is no longer applicable, and the timing advance needs to be updated. When the timing advance of the terminal needs to be adjusted, the base station sends a timing advance command (TAC) to the terminal, and a TAC field occupies 6 bits, indicating $T_A=(0, 1, 2, \ldots, 63)$. After receiving the TAC, the terminal updates the timing advance (TA) according to the following formula 1:

$$TA_{new} = TA_{old} + (T_A - 31) \times 16 \times \frac{64}{2^\mu} \times T_c. \qquad \text{Formula 1}$$

It can be learned from the formula (1) that $$\Delta T_A = TA_{new} - TA_{old} = (T_A - 31) \times 16 \times \frac{64}{2^\mu} \times T_c \cdot T_c$$

is a time unit, $T_c=1/(480000\times4096)$, with a unit of a second, and a value of $\mu$ is determined by a numerology. $T_A$ is a quantized value for timing advance update, and when $T_A=63$ and $\mu=0$, a maximum update duration of the timing advance obtained through calculation is 16.7 us. $TA_{old}$ is a current timing advance, and $TA_{new}$ is a new timing advance.

In the satellite communications system, an implementation of the initial timing advance may be the same as that in an NR or LTE communications system. However, in a mobile satellite system, a round-trip delay changes as a satellite moves, and a timing update procedure in NR or LTE is no longer applicable.

In this embodiment, uplink synchronization is described using an example in which a satellite mobile communications system is a time division duplex (TDD) system. In the TDD system, a communications signal is divided into several slots of a specific length in terms of time, and each slot may be used for uplink transmission or downlink transmission. It is impossible for a satellite to simultaneously send and receive a signal in a specific slot. In the TDD system, uplink synchronization is used not only to avoid interference between terminals, but also to align uplink and downlink frames to avoid uplink and downlink interference. That is, it ensures that the satellite is in the receiving state when the uplink frame arrives at the satellite.

In this embodiment, an example in which the communications signal has slots with an interval of 1 millisecond (ms) is used for description. In an implementation process, a timing advance of each terminal in the satellite communications system may be determined according to a timing criterion, and the timing criterion ensures that a time period in which a signal sent by the terminal arrives at the satellite is exactly an integer multiple of a slot length. In other words, a round-trip delay (RTD) minus a timing advance (TA) needs to be equal to an integer multiple of the slot length ($T_S$). The timing criterion may be expressed in formula 2:

$$RTD-TA=N \times T_S \quad \text{Formula 2,}$$

where RTD represents a round-trip delay, TA represents a timing advance, $T_S$ represents a slot length, and N is a positive integer.

Figure 2:
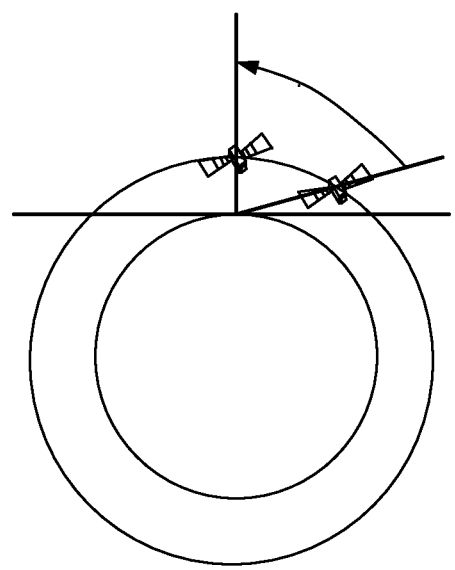
FIG. 2 is a schematic diagram of satellite movement according to an embodiment of this application.
Figure 3:
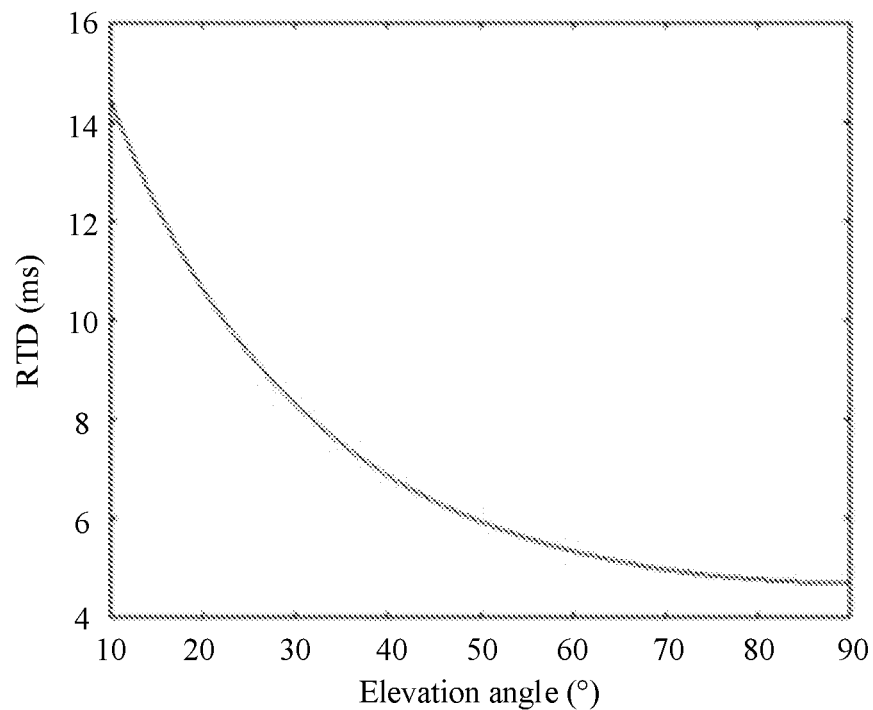
FIG. 3 is a schematic diagram of a relationship between an elevation angle of a satellite and a round-trip delay according to an embodiment of this application.

In the satellite communications system, a satellite, especially a low-orbit satellite, moves at a high speed. To meet the timing criterion, the terminal needs to continuously update the TA. A movement process of the satellite is described with reference to FIG. 2 and FIG. 3. FIG. 2 is a schematic diagram of satellite movement according to an embodiment of this application. FIG. 3 is a schematic diagram of a relationship between an elevation angle of a satellite and a round-trip delay according to an embodiment of this application.

FIG. 2 shows a low-orbit satellite with an orbital altitude of 707 kilometers (km), flying from a position 1 (with an elevation angle of 10°) to a position 2 (with an elevation angle of 90°). It can be seen from FIG. 3 that a round-trip delay is reduced from about 14 ms to about 5 ms. To meet the foregoing timing criterion, the terminal needs to continuously update the TA.

With reference to the foregoing timing criterion, there may be a difference of M slot lengths between a round-trip delay variation and a TA variation, where M is an integer greater than or equal to 0. For details, refer to the derivation processes shown in the following formula 3 to formula 5:

$$RTD1-TA1=N1 \times T_S \quad \text{Formula 3}$$

$$RTD2-TA2=N2 \times T_S \quad \text{Formula 4}$$

$$\Delta RTD-\Delta TA=(N1-N2) \times T_S \quad \text{Formula 5.}$$

N1 and N2 are positive integers, ΔRTD is a round-trip transmission delay variation, and ΔTA is a timing advance variation. In this embodiment, ΔRTD−ΔTA=0 or ΔRTD−ΔTA=+$T_S$ is used as an example for description. The latter occurs when a change in the round-trip delay exceeds a critical point of two slots. As the RTD changes, the system reaches a critical condition, where ΔTA=ΔRTD±$T_S$. When an absolute value of ΔRTD is relatively small, the TA update duration is approximately equal to a slot length. If a TA update manner in NR or LTE is used, a maximum update duration is 16.7 us each time. For one TA update requiring one slot, if 16.7 us is used, a plurality of updates are required, and update efficiency is low.

Figure 4:
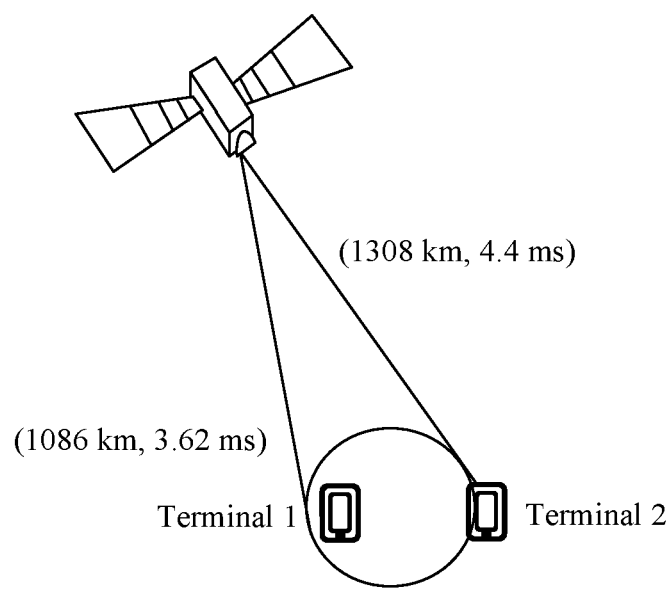
FIG. 4 is a schematic diagram of an uplink delay according to an embodiment of this application.
Figure 5:
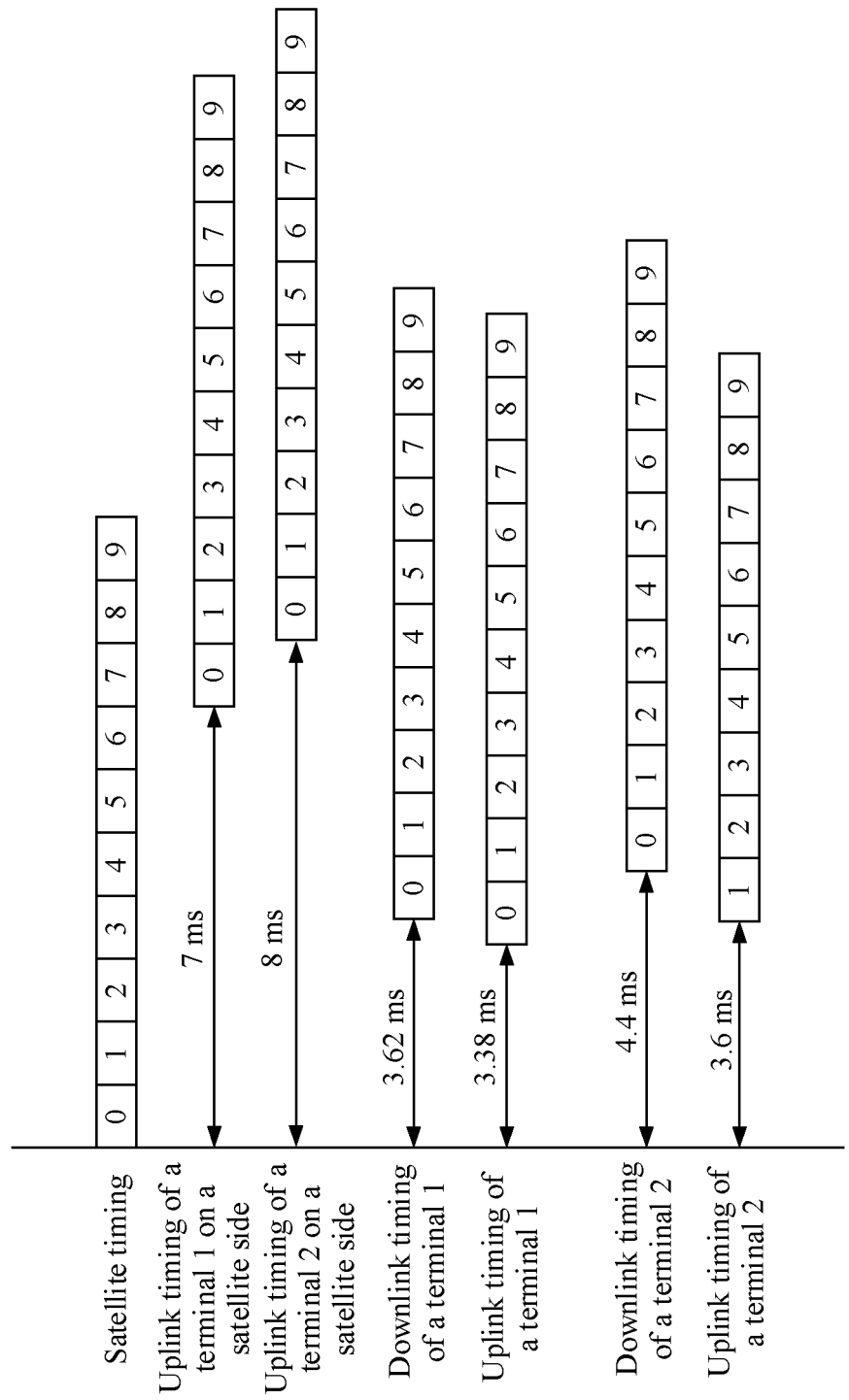
FIG. 5 is a schematic diagram of uplink synchronization according to an embodiment of this application.

If ΔRTD−ΔTA=+$T_S$ is considered, an update range of the TA is [−$T_S$, $T_S$], and the TA is not greater than $T_S$. The following describes in detail, with reference to FIG. 4 and FIG. 5, a principle of uplink synchronization provided in this embodiment. FIG. 4 is a schematic diagram of an uplink delay according to an embodiment of this application. FIG. 5 is a schematic diagram of uplink synchronization according to an embodiment of this application. As shown in FIG. 4, a terminal 1 and a terminal 2 are in a same cell, but delays for the terminal 1 and the terminal 2 to arrive at a satellite are different. Therefore, an uplink synchronization mechanism is required to ensure that there is no interference between the terminal 1 and the terminal 2. A distance between the terminal 1 and the satellite is 1086 kilometers (km), and a one-way transmission delay is 3.62 ms. A distance between the terminal 2 and the satellite is 1308 km, and a one-way transmission delay is 4.4 ms.

In this embodiment, according to the foregoing timing criterion, if the timing advance is not greater than Ts, and when N=7, the TA: 3.62×2−7=0.24 ms of the terminal 1 may be obtained according to the formula 2. For the terminal 2, when N=8, TA: 4.4×2−8=0.8 ms of the terminal 2 may be obtained according to the formula 2. For the timing advance of the terminal 1 and the terminal 2, refer to FIG. 5. As shown in FIG. 5, after the uplink synchronization is performed, times for the terminal 1 and the terminal 2 to arrive at the satellite are exactly an integer multiple of a slot length. A person skilled in the art may understand that, for the satellite, to receive uplink transmission of the terminal 1 and the terminal 2, the satellite needs to perform uplink reception in two consecutive slots.

The embodiments of this application may be used not only in the foregoing satellite communications system, but also in another wireless communications system. It should be noted that the wireless communications system mentioned in the embodiments of this application includes but is not limited to a narrowband internet of things (NB-IoT) system, a global system for mobile communications (GSM), an enhanced data rate for GSM evolution (EDGE) system, a wideband code division multiple access (WCDMA), a code division multiple access 2000 (CDMA2000) system, a time division-synchronous code division multiple access (TD-SCDMA), a long term evolution (LTE) system, and a new radio (NR) mobile communications system in 5th generation (5G) mobile communication.

A network device in the following embodiments may be the foregoing satellite, or may be a base transceiver station (BTS) in a Global System for Mobile Communications (GSM) or code-division multiple access (CDMA), a NodeB (NB) in wideband CDMA (WCDMA), an evolved NodeB (eNB or eNodeB) in LTE, a relay station or an access point, a network side device (for example, a base station) in a 5G network, a network device in a future evolved public land mobile network (PLMN), or the like. This is not limited herein.

In the embodiments of this application, for example, the satellite communications system is used and the network device is a satellite. According to the foregoing timing criterion, the terminal updates the TA of the terminal by itself and the satellite updates the TA of the terminal, thereby improving TA update efficiency.

Example embodiments are used below to describe in detail the technical solutions of this application. The following several embodiments may be combined with each other, and same or similar concepts or processes may not be described repeatedly in some embodiments.

Figure 6:
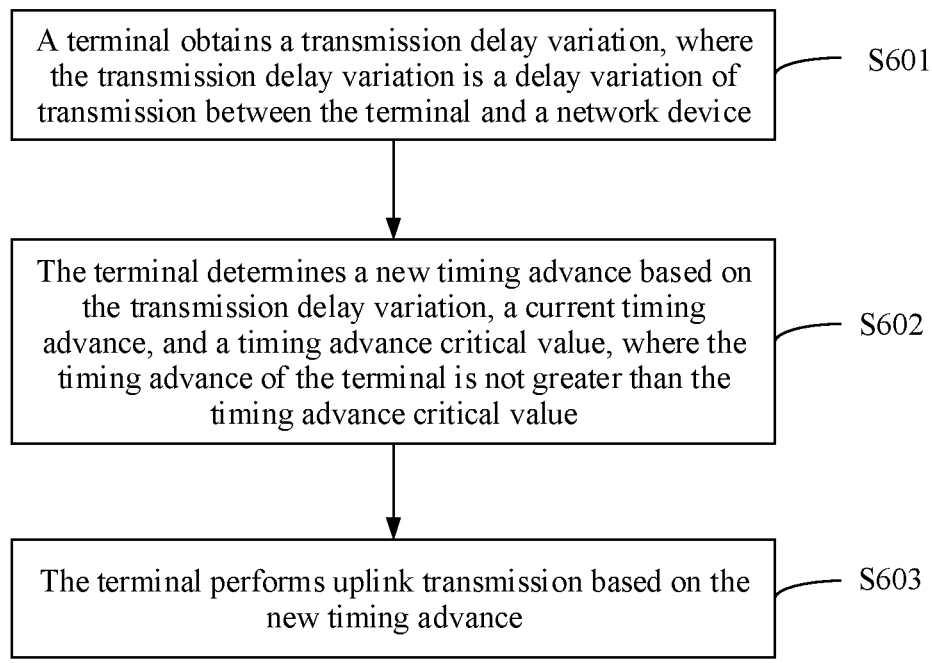
FIG. 6 is a schematic flowchart of a timing advance update method according to an embodiment of this application.

FIG. 6 is a schematic flowchart of a timing advance update method according to an embodiment of this application. In this embodiment, a terminal updates a timing advance by itself, and does not need to receive a timing advance command from a network device, such that the timing advance can be updated in a timely and effective manner. As shown in FIG. 6, the method includes the following steps.

S601. The terminal obtains a transmission delay variation, where the transmission delay variation is a delay variation of transmission between the terminal and the network device.

The terminal may obtain the transmission delay variation when the transmission delay changes, or may periodically obtain the transmission delay variation, where the transmission delay variation is a variation of a round-trip transmission delay between the terminal and the network device. The transmission delay variation may be understood as a variation between a current transmission delay and a previous transmission delay.

The terminal may obtain a distance between the terminal and the network device based on a location of the terminal and a location of the network device, and obtain the transmission delay between the terminal and the network device based on the distance and a transmission medium. The terminal may obtain the transmission delay variation based on the current transmission delay and the previous transmission delay. Alternatively, the terminal may obtain the transmission delay variation in another manner. Details are not described herein in this embodiment.

S602. The terminal determines a new timing advance based on the transmission delay variation, a current timing advance, and a timing advance critical value, where the timing advance of the terminal is not greater than the timing advance critical value.

In this embodiment, a critical value of the timing advance of the terminal is specified, and is referred to as the timing advance critical value. Generally, the timing advance of the terminal is not greater than the timing advance critical value. The timing advance of the terminal herein may be a timing advance in a procedure of updating the timing advance, or may be a timing advance in an initial procedure of determining the timing advance.

The timing advance critical value may be a critical value in a time unit of a subframe, a slot, a symbol, or the like; or may be a critical value in a time unit of a millisecond, a microsecond, or the like. A time unit used for the timing advance critical value is not particularly limited in this embodiment.

In a possible implementation, the timing advance critical value is an integer multiple of a slot length or half a slot length. For example, the timing advance critical value may be one slot length, two slot lengths, or the like.

A person skilled in the art may understand that the timing advance critical value has is the same for the terminal and the network device. In a communications system, the timing advance critical value may be preconfigured for the terminal and the network device. The timing advance critical value may be determined based on the distance between the terminal and the network device.

A candidate timing advance can be determined based on the transmission delay variation and the current timing advance. For example, the candidate timing advance may be obtained according to the following formula 6:

$$TA_{new}=TA_{old}+\Delta RTD \quad \text{Formula 6,}$$

where $TA_{new}$ is the candidate timing advance, $TA_{old}$ is the current timing advance, and $\Delta RTD$ is the transmission delay variation.

If the candidate timing advance is not greater than the timing advance critical value, the candidate timing advance is used as the new timing advance.

If the candidate timing advance is greater than the timing advance critical value, a preset timing advance less than the timing advance critical value may be used as the new timing advance. Alternatively, a timing advance command sent by the network device may be received, the current timing advance is updated using a timing advance update amount in the timing advance command, and the new timing advance is obtained.

S603. The terminal performs uplink transmission based on the new timing advance.

After determining the new timing advance, the terminal performs uplink transmission using the new timing advance. In this embodiment, the uplink transmission may be, for example, uplink transmission of a physical uplink control channel (PUCCH), a physical uplink shared channel PUSCH), a sounding reference signal (SRS), and the like. Specific uplink transmission is not particularly limited in this embodiment.

According to the timing advance update method provided in this embodiment, the terminal obtains the transmission delay variation, and the terminal can actively determine the new timing advance based on the transmission delay variation, the current timing advance, and the timing advance critical value, where the timing advance of the terminal is not greater than the timing advance critical value. The terminal performs uplink transmission based on the new timing advance. Because the new timing advance is actively updated by the terminal, the new timing advance does not need to be determined based on the timing advance command sent by the network device, thereby improving update efficiency of the timing advance.

Based on the foregoing embodiments, the following describes in detail the technical solutions of this application using example embodiments. The following several embodiments may be combined with each other, and same or similar concepts or processes may not be described repeatedly in some embodiments.

Figure 7:
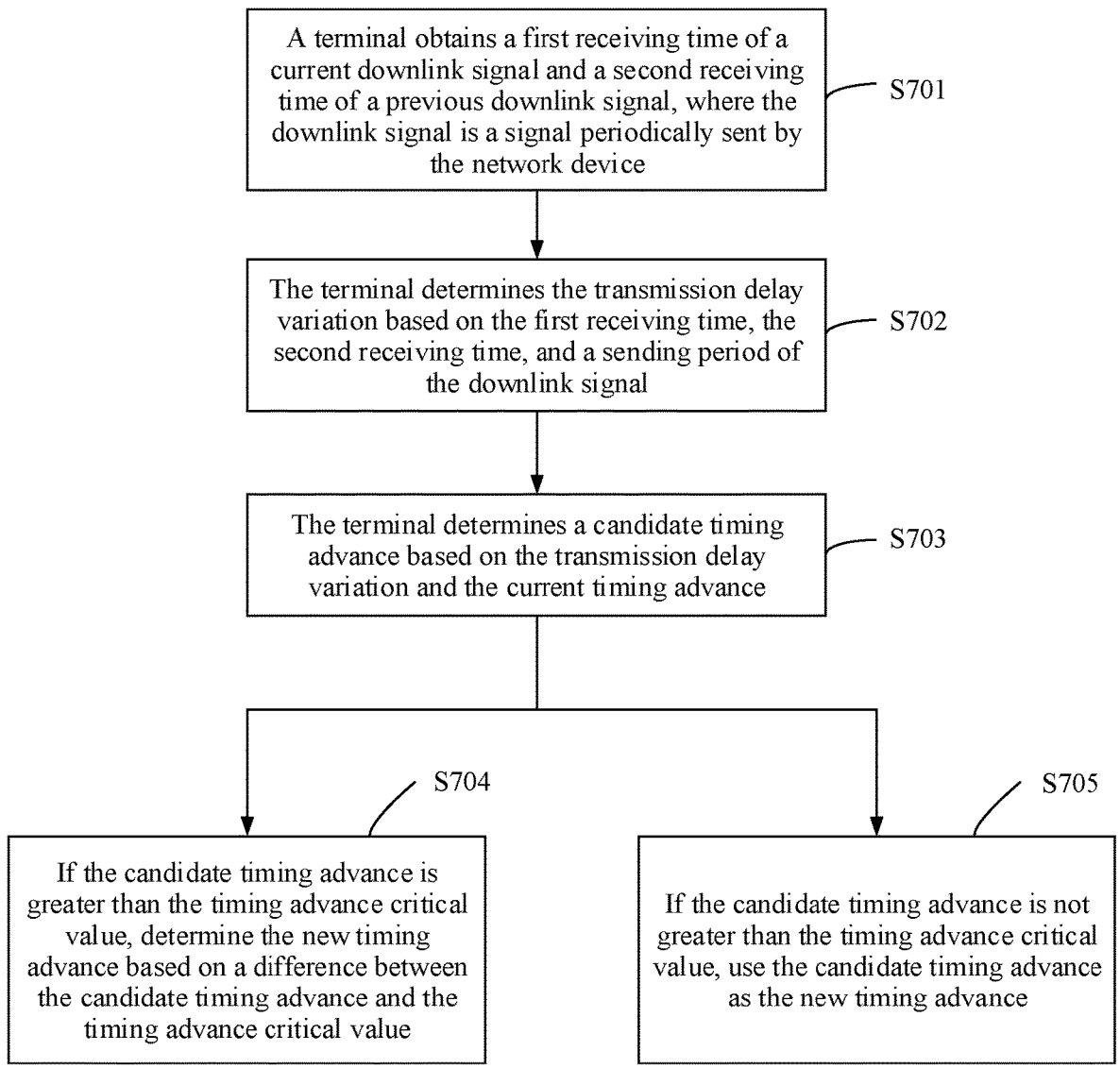
FIG. 7 is a flowchart of a timing advance update method according to an embodiment of this application.

FIG. 7 is a flowchart of a timing advance update method according to an embodiment of this application. As shown in FIG. 7, the method includes the following steps.

S701. A terminal obtains a first receiving time of a current downlink signal and a second receiving time of a previous downlink signal, where the downlink signal is a signal periodically sent by a network device.

S702. The terminal determines a transmission delay variation based on the first receiving time, the second receiving time, and a sending periodicity of the downlink signal.

The network device periodically sends the downlink signal to the terminal, and the terminal may determine the transmission delay variation based on the periodic downlink signal. The periodic downlink signal may be one of a primary synchronization signal, a secondary synchronization signal, or a pilot signal.

In a process in which the terminal completes cell search, a primary synchronization signal (PSS) and a secondary synchronization signal (SSS) need to be transmitted in a downlink. The secondary synchronization signal indicates a cell group identifier, and the primary synchronization signal indicates a cell identifier. A specific cell identifier may be determined based on both the secondary synchronization signal and the primary synchronization signal.

The primary synchronization signal is used as an example, and other signals are similar. Details are not described herein in this embodiment. A transmission periodicity of the primary synchronization signal may be, for example, 20 ms, 40 ms, 80 ms, or 160 ms. The sending periodicity of the PSS may be preconfigured for the terminal, or may be indicated by the network device to the terminal using indication information, or may be determined by the terminal based on another configuration parameter. An implementation in which the terminal obtains the PSS periodicity is not particularly limited in this embodiment. In a possible implementation, the sending periodicity of the PSS may change according to a system configuration, where the system configuration may be, for example, orbit information and a subcarrier spacing.

Different orbit information causes different changes in a round-trip transmission delay. Different subcarriers correspond to different numerologies, and different numerologies correspond to different cyclic prefix lengths. A shorter cyclic prefix indicates a shorter TA adjustment periodicity and a shorter PSS update periodicity. Table 1 shows a possible example. Table 1 shows a correspondence between a numerology and a PSS periodicity when an altitude of a satellite is 707 kilometers (km).

TABLE 1

| Numerology | 0 | 1 | 2 | 2 | 3 | 4 |
|---|---|---|---|---|---|---|
| Subcarrier spacing (kHz) | 15 | 30 | 60 | 60 | 120 | 240 |
| Cyclic prefix (CP) | Normal | Normal | Normal | Extended | Normal | Normal |
| Orthogonal frequency-division multiplexing (OFDM) symbol duration | 66.67 us | 33.33 us | 16.67 us | 16.67 us | 8.33 us | 4.17 us |
| CP duration | 4.69 us | 2.34 us | 1.17 us | 4.2 us | 0.57 us | 0.29 us |
| OFDM symbol duration including CP | 71.35 us | 35.68 us | 17.84 us | 20.87 us | 8.92 us | 4.46 us |
| PSS period | 20/40/80 | 20/40 | 20 | 20/40/80 | NA | NA |

Figure 8A:
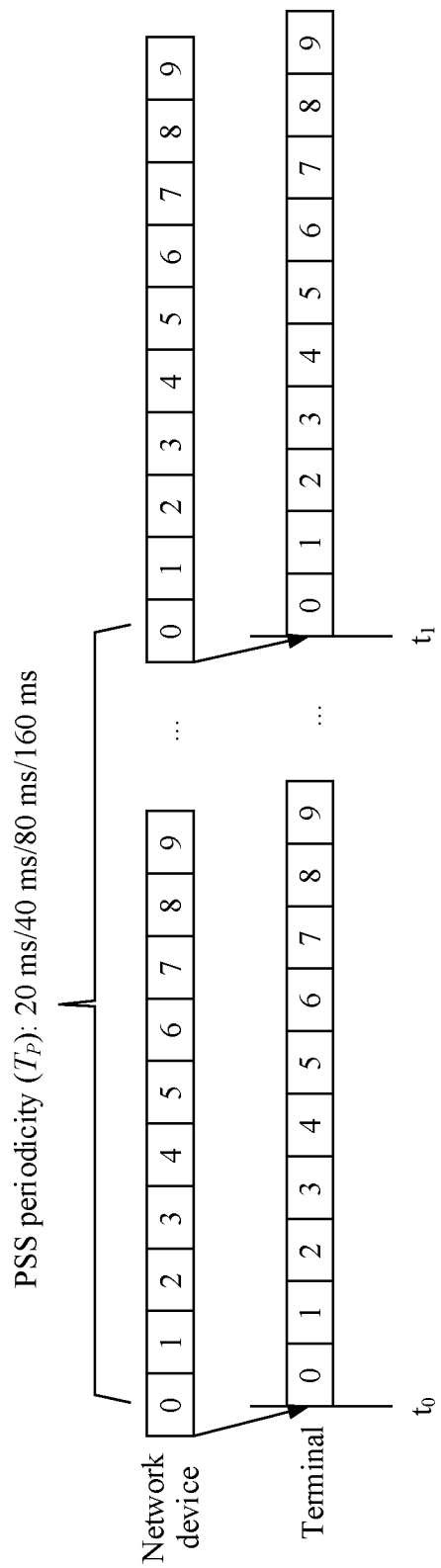
FIG. 8A is a schematic diagram of periodic transmission of a primary synchronization signal according to an embodiment of this application.
Figure 8B:
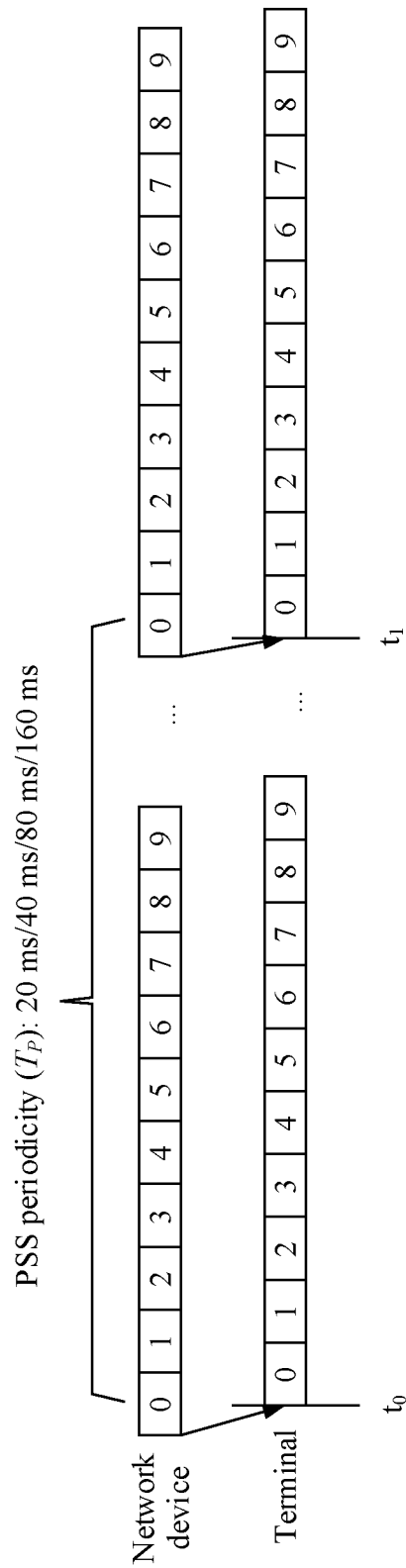
FIG. 8B is a schematic diagram of periodic transmission of a primary synchronization signal according to an embodiment of this application.
Figure 8C:
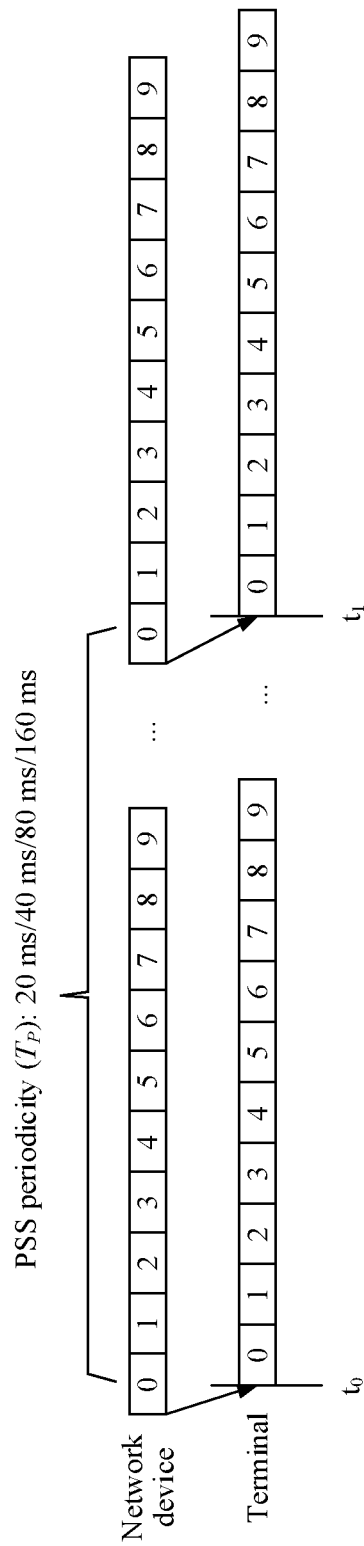
FIG. 8C is a schematic diagram of periodic transmission of a primary synchronization signal according to an embodiment of this application.

FIG. 8A, FIG. 8B, and FIG. 8C are schematic diagrams of periodic transmission of a primary synchronization signal according to an embodiment of this application. As shown in FIG. 8A and FIG. 8B, $t_0$ is a receiving time at which the terminal receives the first PSS, and $t_1$ is a receiving time at which the terminal receives the second PSS. After the terminal receives the second PSS, the terminal obtains the first receiving time $t_1$ of the current downlink signal, and obtains the second receiving time $t_0$ of the previous downlink signal from a buffer.

After the first receiving time, the second receiving time, and the sending periodicity are obtained, the transmission delay variation may be obtained according to the following formula 7:

$$\Delta RTD = (t_1 - t_0 - T_p) \times 2 \quad \text{Formula 7,}$$

where $t_1$ indicates the receiving time of the current downlink signal, $t_0$ indicates the receiving time of the previous downlink signal, and $T_p$ indicates the sending periodicity of the downlink signal.

As shown in FIG. 8A, FIG. 8B, and FIG. 8C, the network device periodically sends a PSS. For timing of the network device, a time interval between any two adjacent PSSs sent by the network device is always one sending periodicity, that is, 20 ms, 40 ms, 80 ms, or 160 ms. However, for timing of the terminal, because a distance between the terminal and the network device changes, a transmission delay changes, and downlink timing of receiving PSSs by the terminal is not unique. Therefore, a time interval between any two adjacent PSSs received by the terminal varies as the distance between the terminal and the network device changes.

As shown in FIG. 8A, when the terminal receives two adjacent downlink signals, if a transmission distance between the terminal and the network device at a moment $t_1$ does not change compared to that at the moment $t_0$, $t_1-t_0=T_p$. As shown in FIG. 8B, if a transmission distance between the terminal and the network device is smaller at a moment $t_1$ compared to that at the moment $t_0$, a transmission delay corresponding to $t_1$ is relatively small, and $t_1-t_0<T_p$. As shown in FIG. 8C, if a transmission distance between the terminal and the network device is larger at a moment $t_1$ compared to that at the moment $t_0$, a transmission delay corresponding to $t_1$ is relatively large, and $t_1-t_0>T_p$.

A one-way transmission delay variation may be obtained according to $t_1-t_0-T_p$, and a round-trip transmission delay variation may be obtained according to the formula 7.

In the foregoing embodiment, the primary synchronization signal is used as an example for description. Implementation of a pilot signal is similar. The pilot signal may also be referred to as a reference signal. The pilot signal may have functions such as downlink channel quality measurement and downlink channel estimation, and is used for coherent detection and demodulation of the terminal. A periodicity of the pilot signal is relatively short. For example, the periodicity of the pilot signal is 224 us. Therefore, the TA update periodicity is short, and real-time update can be implemented. In a possible implementation, to prevent the terminal from frequently updating the TA and improve TA update accuracy, for example, a plurality of $\Delta RTD$ may be obtained and then an average value is calculated; or for another example, a result is optimized through a plurality of times of measurement filtering.

S703. The terminal determines a candidate timing advance based on the transmission delay variation and the current timing advance.

S704. If the candidate timing advance is greater than the timing advance critical value, determine the new timing advance based on a difference between the candidate timing advance and the timing advance critical value.

S705. If the candidate timing advance is not greater than the timing advance critical value, use the candidate timing advance as the new timing advance.

After the transmission delay variation is obtained, the candidate timing advance may be obtained with reference to the foregoing formula 6. That is, the candidate timing advance is obtained according to $TA_{new}=TA_{old}+\Delta RTD$.

Figure 9A:
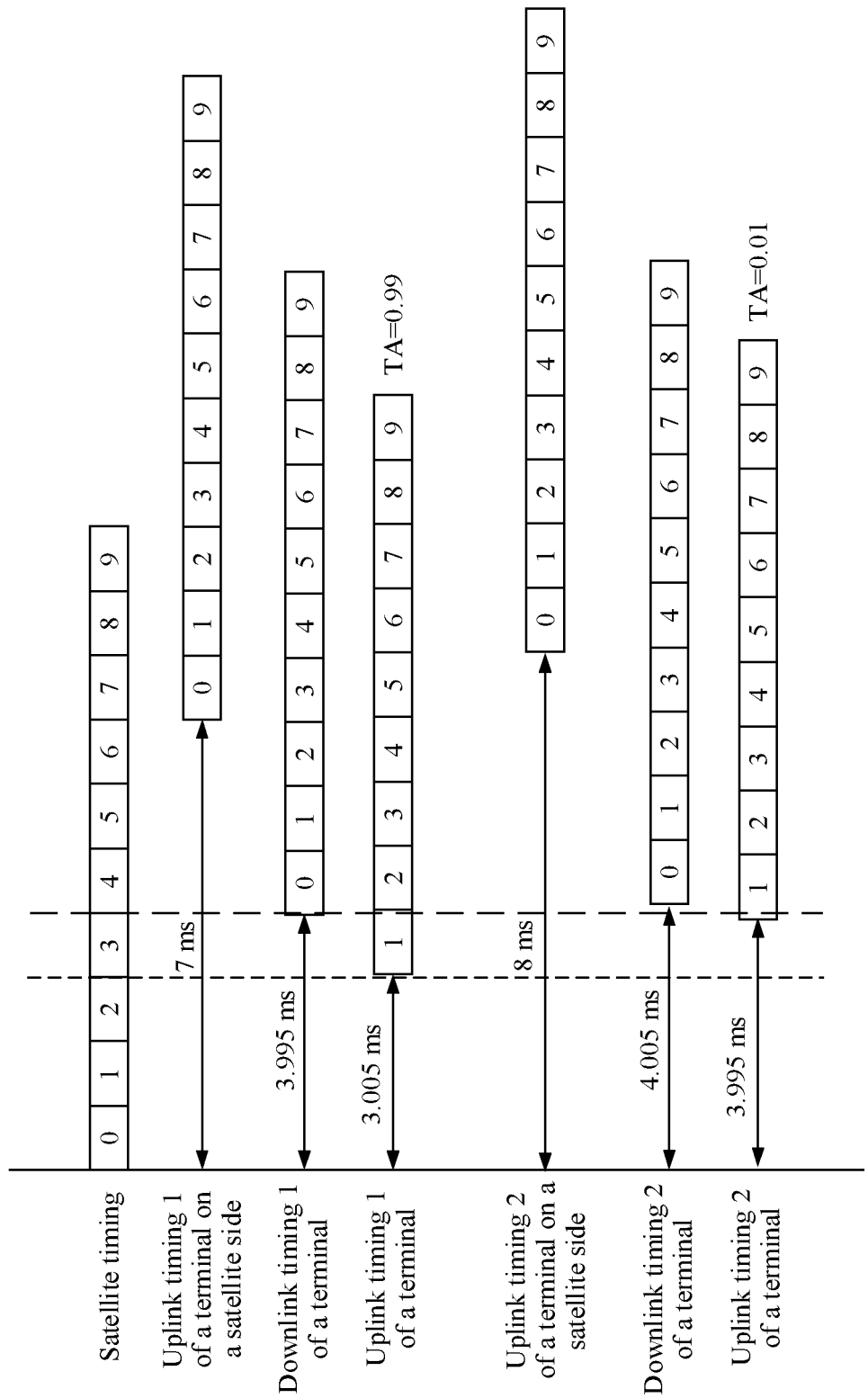
FIG. 9A is a schematic diagram of uplink synchronization according to an embodiment of this application.

After the candidate timing advance is obtained, the final new timing advance is determined based on whether $T_{Anew}$ is greater than the timing advance critical value $TA_c$. In this embodiment, an example is used for description. For example, the timing advance critical value $TA_c$ is equal to 1 Ts, that is, one slot lasts 1 ms. FIG. 9A is a schematic diagram of uplink synchronization according to an embodiment of this application. Descriptions are provided with reference to FIG. 9A and Table 2.

TABLE 2

| | RTD 1 (ms) | TA 1 (ms) | RTD 2 (ms) | TA 2 (ms) | ΔRTD | ΔTA |
|---|---|---|---|---|---|---|
| Example 1 | 7.99 | 0.99 | 8.01 | 0.01 | 0.02 | −0.98 |
| Example 2 | 8.01 | 0.01 | 7.99 | 0.99 | −0.02 | 0.98 |

As shown in FIG. 9A, in example 1, timing 1 occurs earlier than timing 2. To be more specific, the timing 1 occurs first, and then the timing 2 occurs. The round-trip transmission delay RTD 1 corresponding to the timing 1 is 7.99 ms, the TA 1 corresponding to the timing 1 is 3.995× 2−7=0.99 ms, uplink timing 1 of the terminal is in the fourth slot (marked as 3 in the figure), and uplink timing 1 of a terminal on a satellite side is aligned with the eighth slot (marked as 7 in the figure).

ΔRTD=0.02 is obtained in the foregoing manner of periodical reception of the PSSs, that is, the round-trip transmission delay RTD 2 corresponding to the timing 2 is 8.01 ms. In this case, $TA_{new}=TA_{old}+\Delta RTD=0.99+0.02=1.01$. It can be learned that the candidate timing advance is 1.01, and the candidate timing advance is greater than the timing advance critical value $TA_c$. In this case, the new timing advance $TA_{new}=1.01-1=0.01$ is determined based on a difference between the candidate timing advance and the timing advance critical value.

Therefore, the TA 2 corresponding to the timing 2 of the terminal is 0.01, the uplink timing 2 of the terminal is still in the fourth slot, and the timing of the terminal on the satellite side is aligned with the ninth slot.

Still referring to FIG. 9A, in example 2, timing 2 occurs earlier than timing 1. To be more specific, the timing 2 occurs first, and then the timing 1 occurs. The round-trip transmission delay RTD 1 corresponding to the timing 2 is 8.01 ms, and the TA 1 corresponding to the timing 2 is 4.005×2−7=1.01 ms. In this case, the TA 1 is greater than the timing advance critical value, and therefore, the final TA 1 is equal to 1.01−1=0.01 ms. The uplink timing 2 of the terminal is in the fourth slot, and the uplink timing 2 of the terminal on the satellite side is aligned with the ninth slot.

ΔRTD=−0.02 is obtained in the foregoing manner of periodical reception of the PSSs, that is, the round-trip transmission delay RTD 2 corresponding to the timing 1 is 7.99 ms. In this case, $TA_{new}=TA_{old}+\Delta RTD=0.01+1-0.02=0.99$. Since the timing advance critical value is subtracted at the timing 2, the timing advance critical value further needs to be added to the actual $TA_{old}$, that is, $TA_{old}=0.01+1=1.01$.

Therefore, the TA 2 corresponding to the timing 1 of the terminal is 0.99, the uplink timing 1 of the terminal is still in the fourth slot, and the uplink timing of the terminal on the satellite side is aligned with the eighth slot.

It can be learned from example 1 and example 2 that the uplink timing of the terminal on the satellite side is aligned with the eighth slot and the ninth slot. That is, the network device needs to perform uplink reception in two consecutive slots. A person skilled in the art may understand that a quantity of consecutive slots used by the network device to perform uplink reception is greater than a quantity of slots corresponding to the timing advance critical value. For example, when the timing advance critical value is one slot, the quantity of consecutive slots used by the network device to perform uplink reception is 2. When an uplink synchronization requirement is met, to save physical resources, the timing advance critical value may be set to one slot.

Figure 9B:
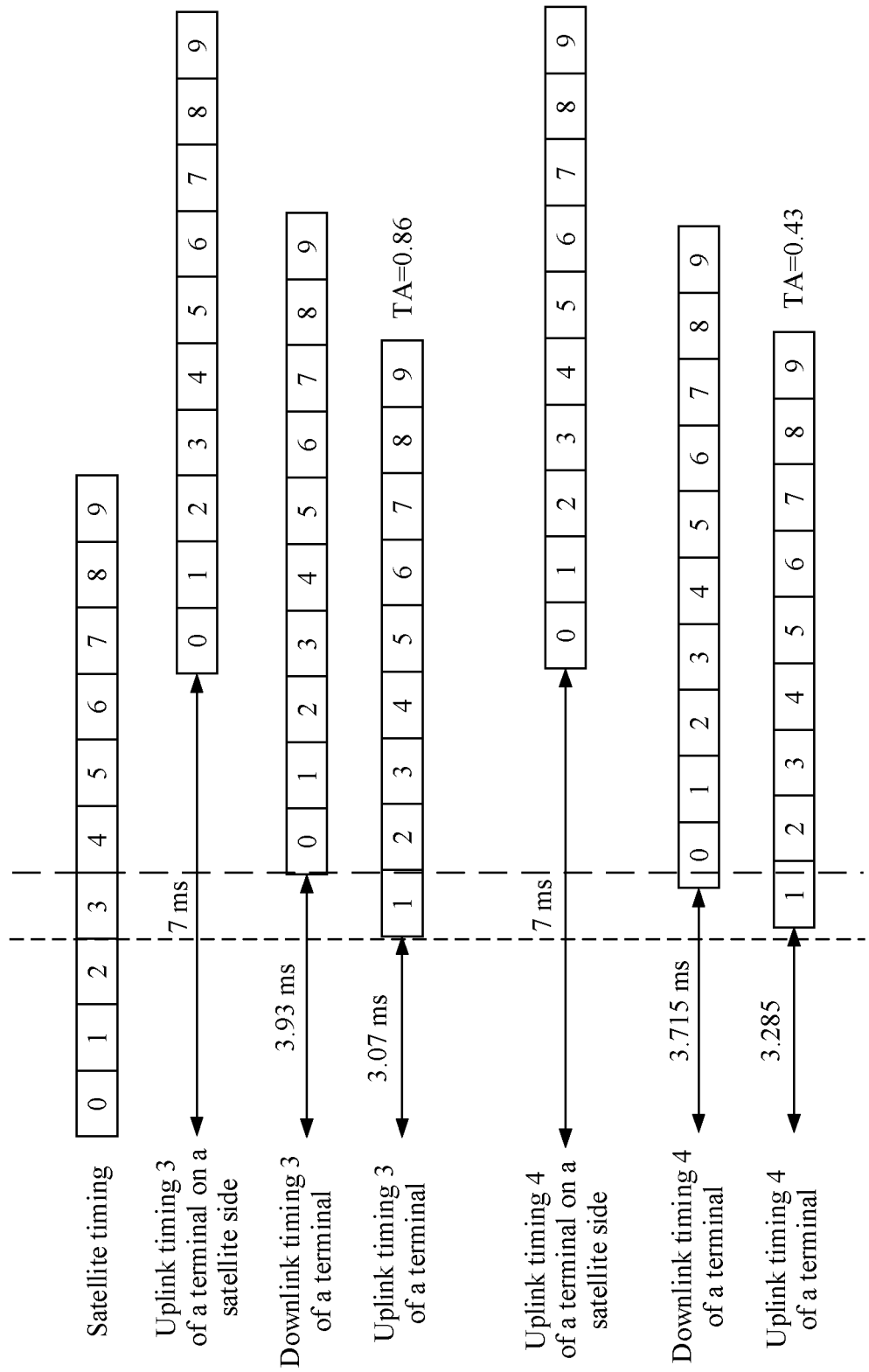
FIG. 9B is a schematic diagram of uplink synchronization according to an embodiment of this application.

FIG. 9B is a schematic diagram of uplink synchronization according to an embodiment of this application. Descriptions are provided with reference to FIG. 9B and Table 3.

TABLE 3

| | RTD 1 (ms) | TA 1 (ms) | RTD 2 (ms) | TA 2 (ms) | ΔRTD | ΔTA |
|---|---|---|---|---|---|---|
| Example 3 | 7.86 | 0.86 | 7.43 | 0.43 | −0.43 | −0.43 |
| Example 4 | 7.43 | 0.43 | 7.86 | 0.86 | 0.43 | 0.43 |

As shown in FIG. 9B, in example 3, timing 3 occurs earlier than timing 4. To be more specific, the timing 3 occurs first, and then the timing 4 occurs. The round-trip transmission delay RTD 1 corresponding to the timing 3 is 7.86 ms, the TA 1 corresponding to the timing 3 is 3.93×2−7=0.86 ms, uplink timing 1 of the terminal is in the fourth slot, and uplink timing 1 of a terminal on a satellite side is aligned with the eighth slot.

ΔRTD=−0.43 is obtained in the foregoing manner of periodical reception of the PSSs, that is, the round-trip transmission delay RTD 2 corresponding to the timing 4 is 7.43 ms. In this case, $TA_{new}=TA_{old}+\Delta RTD=0.86-0.43=0.43$. It can be learned that the candidate timing advance is 0.43, and the candidate timing advance is less than the timing advance critical value $TA_c$. In this case, the candidate timing advance is used as the new timing advance.

Still referring to FIG. 9B, in example 4, timing 4 occurs earlier than timing 3. To be more specific, the timing 4 occurs first, and then the timing 3 occurs. The round-trip transmission delay RTD 1 corresponding to the timing 4 is 7.43 ms, and the TA 1 corresponding to the timing 4 is 3.715×2−7=0.43 ms. The uplink timing 4 of the terminal is in the fourth slot, and the uplink timing 4 of the terminal on the satellite side is aligned with the eighth slot.

ΔRTD=0.43 is obtained in the foregoing manner of periodical reception of the PSSs, that is, the round-trip transmission delay RTD 2 corresponding to the timing 3 is 7.86 ms. In this case, $TA_{new}=TA_{old}+\Delta RTD=0.43+0.43=0.86$. It can be learned that the candidate timing advance is 0.86, and the candidate timing advance is less than the timing advance critical value $TA_c$. In this case, the candidate timing advance is used as the new timing advance.

According to the timing advance update method provided in this embodiment, the terminal obtains the first receiving time of the current downlink signal and the second receiving time of the previous downlink signal. The terminal determines the transmission delay variation based on the first receiving time, the second receiving time, and the sending periodicity of the periodically sent downlink signal. In this manner, the terminal may quickly and accurately obtain the transmission delay variation based on the receiving time of the signal, such that the candidate timing advance is determined based on the transmission delay variation and the current timing advance, and the new timing advance may be determined based on the candidate timing advance and the timing advance critical value. As such, the terminal can update the timing advance by itself, thereby improving update efficiency of the timing advance. When the candidate timing advance is greater than the timing advance critical value, the new timing advance is determined based on the difference between the candidate timing advance and the timing advance critical value. The timing advance continuously updated by the terminal is always within one slot, and does not occupy more slots, such that resources on a terminal side are saved, and it is ensured that uplink transmission of the terminal does not interfere with another operation of the terminal.

Based on the foregoing embodiment, the network device may also synchronously determine a timing advance update amount, and then send the timing advance update amount to the terminal; and the terminal updates the timing advance based on the timing advance update amount.

Figure 10:
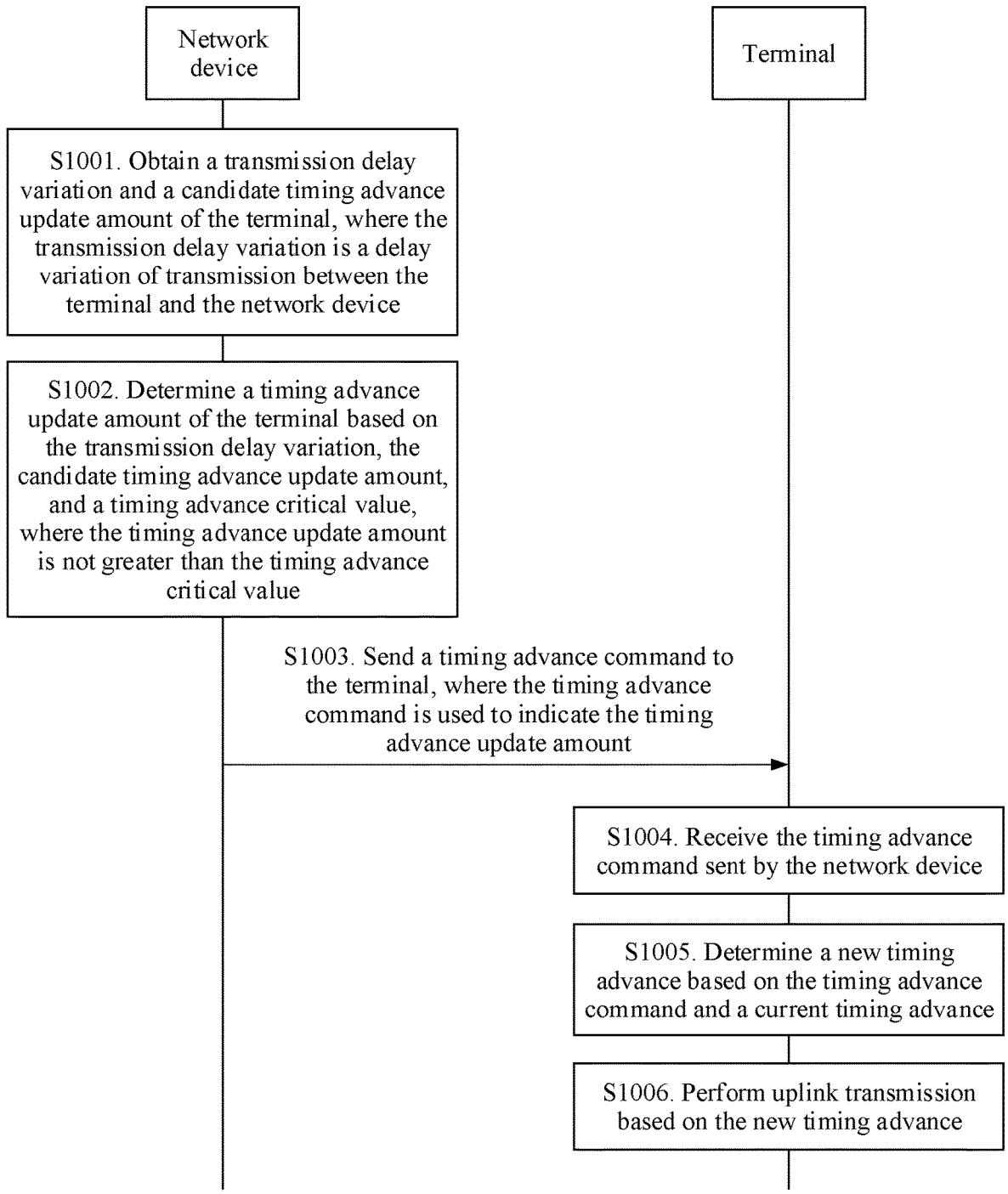
FIG. 10 is a signaling flowchart of a timing advance update method according to an embodiment of this application.

FIG. 10 is a signaling flowchart of a timing advance update method according to an embodiment of this application. As shown in FIG. 10, the method includes the following steps.

S1001. A network device obtains a transmission delay variation and a candidate timing advance update amount of a terminal, where the transmission delay variation is a delay variation of transmission between the terminal and the network device.

When the network device is a satellite, the satellite may obtain the transmission delay variation based on orbit information of the satellite. For example, the satellite obtains the transmission delay variation based on the correspondence between an elevation angle and a transmission delay variation shown in FIG. 3. The transmission delay variation is a round-trip delay variation of transmission between the terminal and the network device.

The network device may determine the candidate timing advance update amount of the terminal based on uplink transmission of the terminal. Theoretically, the network device may estimate the timing advance update amount of the terminal provided that the terminal performs uplink transmission. The uplink transmission may be transmission of any signal sent by the terminal, for example, a sounding reference signal (SRS), or a demodulation reference signal (DMRS), or the uplink transmission may be transmission of a channel quality indicator (CQI), an acknowledgment (ACK), a negative ACK (NACK), a physical uplink shared channel (PUSCH), or the like, where all the foregoing may be used by the network device to obtain the timing advance update amount.

S1002. The network device determines the timing advance update amount of the terminal based on the transmission delay variation, the candidate timing advance update amount, and a timing advance critical value, where the timing advance update amount is not greater than the timing advance critical value.

It can be learned from the foregoing description that a critical condition of a system is $\Delta TA = \Delta RTD \pm T_S$, that is, a round-trip transmission delay variation exceeds a critical point of two slots. The timing advance update amount is determined according to the critical condition.

In a possible implementation, if a difference between the transmission delay variation and the candidate timing advance update amount is equal to 0, it indicates that the round-trip transmission delay variation does not exceed a critical point of two slots. Therefore, the network device may perform no processing, and the terminal may update the TA by itself using the embodiment shown in FIG. 6 or FIG. 7; or the network device updates the TA in a manner in LTE or NR.

In another possible implementation, if a difference between the transmission delay variation and the candidate timing advance update amount is equal to the timing advance critical value, the candidate timing advance update amount is determined as the timing advance update amount of the terminal.

Still referring to the foregoing Table 2, in example 1, the transmission delay variation ΔRTD is 0.02, and the determined candidate timing advance update amount ΔTA is −0.98. In this case, $\Delta TA = \Delta RTD \pm T_S$ is met, that is, −0.98=0.02−1. Therefore, −0.98 is used as the timing advance update amount.

In example 2, the transmission delay variation ΔRTD is −0.02, and the determined candidate timing advance update amount ΔTA is 0.98. In this case, $\Delta TA = \Delta RTD \pm T_S$ is met, that is, 0.98=−0.02+1. Therefore, 0.98 is used as the timing advance update amount.

Optionally, before the candidate timing advance update amount is used as the timing advance update amount, it is determined that an absolute value of the transmission delay variation is less than a preset threshold. To be more specific, when the transmission delay variation is small enough, the timing advance update amount is relatively large. The preset threshold is, for example, half a slot. When an absolute value of the transmission delay variation is greater than a preset threshold, the network device performs no processing, or updates the TA in a manner in LTE or NR.

S1003. The network device sends a timing advance command to the terminal, where the timing advance command indicates the timing advance update amount.

S1004. The terminal receives the timing advance command sent by the network device, where the timing advance command indicates the timing advance update amount, and the timing advance update amount indicated by the timing advance command is not greater than the timing advance critical value.

S1005. The terminal determines a new timing advance based on the timing advance command and a current timing advance.

S1006. The terminal performs uplink transmission based on the new timing advance.

In this embodiment, it can be learned from $\Delta TA = \Delta RTD \pm NT_S$ that N is an integer greater than or equal to 1, and Ts is one slot. When ΔRTD is relatively small, ΔTA is close to $+NT_S$. Therefore, an update range of ΔTA includes $[-NT_S, +NT_S]$. Because the update range of ΔTA changes, a length of the timing advance command changes. The length of the timing advance command may be implemented according to the following formula 8:

$$2^{M+6} - (2^{M+5} - 1) \geq \left( \frac{NT_S}{16 \times 64/2^\mu \times T_c} \right), \quad \text{Formula 8}$$

where M is the length of the timing advance command, $T_c$ is a time unit, $T_c = 1/(480000 \times 4096)$, with a unit of a second, and a value of μ is determined by a numerology.

When μ=0, and N=1, that is, the timing advance critical value is one slot, the calculated minimum M is 6. Therefore, the length of the timing advance command (TAC) is 12 bits, used to indicate $T_A = (0, 1, 2, \ldots, 3840)$.

After receiving the TAC, the terminal may obtain a new timing advance update amount according to the following formula 9:

$$TA_{new} = TA_{old} + (T_A - 1920) \times 16 \times \frac{64}{2^\mu} \times T_c, \quad \text{Formula 9}$$

where when $T_A=0$, ΔTA=−Ts; or when $T_A=3840$, ΔTA=Ts.

Figure 11:
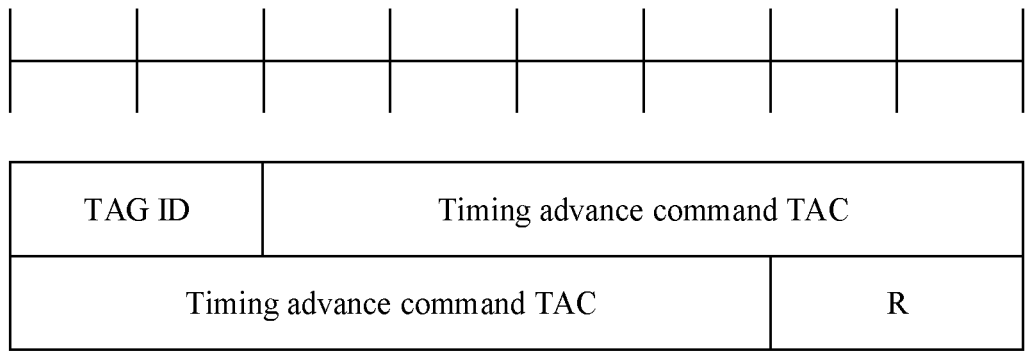
FIG. 11 is a format diagram of a timing advance command according to an embodiment of this application.

For a format of the TAC provided in this embodiment, refer to FIG. 11. The TAC may be transmitted using a timing advance command media access control (MAC) control element (TAC MAC CE). A TAC field has 12 bits in total, that is, 6 bits are extended on the basis of existing 6 bits. The TAC MAC CE may further include a timing advance group (TAG) identifier (TAG ID). The TAC MAC CE further includes a reserved bit.

After obtaining the new timing advance, the terminal performs uplink transmission based on the new timing advance. A person skilled in the art may understand that, the new timing advance obtained by the terminal according to formula 9 does not exceed the timing advance critical value (for example, as shown in Table 2). That is, uplink transmission of the timing advance performed by the terminal is always in a same slot, and another operation of the terminal is not affected.

According to the timing advance update method provided in this embodiment, the network device obtains the transmission delay variation and the candidate timing advance update amount of the terminal, and the network device determines the timing advance update amount of the terminal based on the transmission delay variation, the candidate timing advance update amount, and the timing advance critical value. The network device sends, to the terminal, the timing advance command used to indicate the timing advance update amount. Because the timing advance critical value is set, a range of the timing advance update amount is extended, and efficiency of updating the TA of the terminal by the network device is improved.

Based on the foregoing embodiment, in a possible implementation, when the critical condition is met, whether the network device updates the timing advance of the terminal may be determined through negotiation between the network device and the terminal.

For example, it may be negotiated that the terminal performs uplink transmission based on the new timing advance that is not greater than the timing advance critical value. When the critical condition is met, the terminal does not perform S704 in the embodiment in FIG. 7, and the network device sends the timing advance command to the terminal to update the timing advance of the terminal.

For another example, it may be negotiated that the terminal completes update of the timing advance (for example, using the method shown in FIG. 7), and the network device does not send the timing advance command to the terminal.

For another example, it may be negotiated that the terminal determines the new timing advance by itself (for example, using the method shown in FIG. 7) based on the timing advance critical value. In addition, when the timing advance update amount meets the foregoing critical condition, the network device sends the timing advance update amount to the terminal. In this case, the terminal updates the TA based on the timing advance update amount sent by the network device. When the terminal determines the new timing advance by itself and also determines the timing advance based on the timing advance command, a specific timing advance used for uplink transmission may be determined through negotiation.

Figure 12:
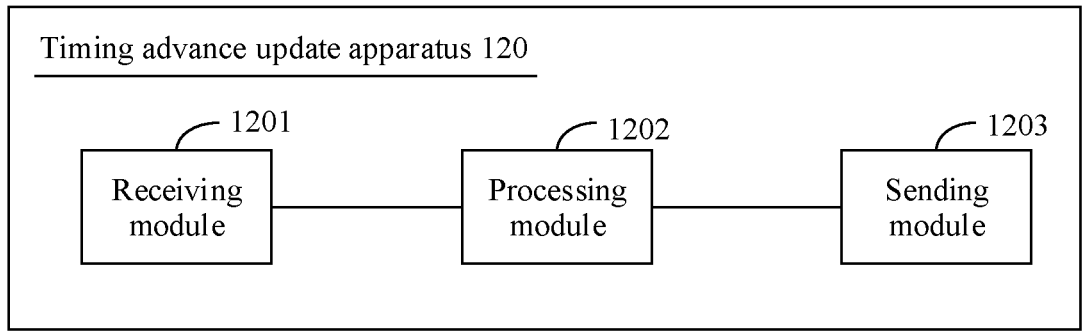
FIG. 12 is a schematic structural diagram of a timing advance update apparatus according to an embodiment of this application.

FIG. 12 is a schematic structural diagram of a timing advance update apparatus 120 according to an embodiment of this application. As shown in FIG. 12, the timing advance update apparatus 120 includes: a receiving module 1201 configured to obtain a transmission delay variation, where the transmission delay variation is a delay variation of transmission between a terminal and a network device; a processing module 1202 configured to determine a new timing advance based on the transmission delay variation, a current timing advance, and a timing advance critical value, where the timing advance of the terminal is not greater than the timing advance critical value; and a sending module 1203 configured to perform uplink transmission based on the new timing advance.

The timing advance update apparatus 120 provided in this embodiment of this application is configured to perform the method embodiment shown in FIG. 6. An implementation principle and a technical effect of the timing advance update apparatus 120 are similar to those of the method embodiment. Details are not described herein again in this embodiment.

In a possible design, the processing module 1202 is configured to: determine a candidate timing advance based on the transmission delay variation and the current timing advance; and determine the new timing advance based on the candidate timing advance and the timing advance critical value.

In a possible design, the processing module 1202 is configured to: if the candidate timing advance is greater than the timing advance critical value, determine the new timing advance based on a difference between the candidate timing advance and the timing advance critical value; or if the candidate timing advance is not greater than the timing advance critical value, use the candidate timing advance as the new timing advance.

In a possible design, the receiving module 1201 is configured to: obtain a first receiving time of a current downlink signal and a second receiving time of a previous downlink signal, where the downlink signal is a signal periodically sent by the network device; and determine the transmission delay variation based on the first receiving time, the second receiving time, and a sending periodicity of the downlink signal.

In a possible design, the downlink signal is one of the following: a primary synchronization signal, a secondary synchronization signal, or a pilot signal.

In a possible design, the receiving module 1201 is further configured to receive a timing advance command sent by the network device, where the timing advance command indicates a timing advance update amount, and where the timing advance update amount indicated by the timing advance command is not greater than the timing advance critical value.

The processing module 1202 is further configured to determine the new timing advance based on the timing advance command and the current timing advance.

In a possible design, the timing advance critical value is an integer multiple of a slot length.

In a possible design, the network device is a satellite.

The timing advance update apparatus 120 provided in this embodiment of this application is configured to perform the method embodiment shown in FIG. 7. An implementation principle and a technical effect of the timing advance update apparatus 120 are similar to those of the method embodiment. Details are not described herein again in this embodiment.

Optionally, during hardware implementation, the processing module 1202 in this embodiment may be integrated into a processor for implementation, the sending module 1203 may be integrated into a transmitter for implementation, and the receiving module 1201 may be integrated into a receiver for implementation.

Figure 13:
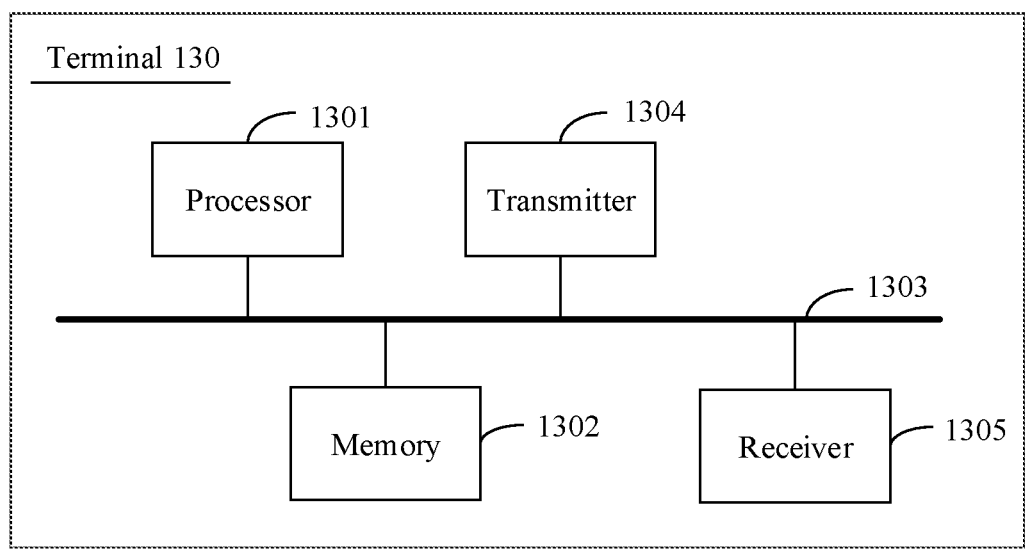
FIG. 13 is a schematic diagram of a hardware structure of a terminal according to an embodiment of this application.

FIG. 13 is a schematic diagram of a hardware structure of a terminal 130 according to an embodiment of this application. As shown in FIG. 13, the terminal 130 includes: a processor 1301 and a memory 1302, where the memory 1302 is configured to store a computer program; and the processor 1301 is configured to execute the computer program stored in the memory 1302, to implement the steps performed by the terminal 130 in the foregoing embodiment. For details, refer to related descriptions in the foregoing method embodiments, for example, descriptions shown in FIG. 6 and FIG. 7.

Optionally, the memory 1302 may be independent, or may be integrated with the processor 1301.

When the memory 1302 is a device independent of the processor 1301, the terminal 130 may further include a bus 1303 for connecting the memory 1302 and the processor 1301.

The terminal shown in FIG. 13 may further include a transmitter 1304 and a receiver 1305. The receiver 1305 may, for example, receive a downlink signal periodically sent by a network device, and the processor 1301 may determine a transmission delay variation based on the received periodic downlink signal.

The terminal 130 provided in this embodiment may be configured to perform the method performed by the terminal in the foregoing embodiment. An implementation principle and a technical effect of the terminal 130 are similar to those of the foregoing embodiment. Details are not described herein again in this embodiment.

Figure 14:
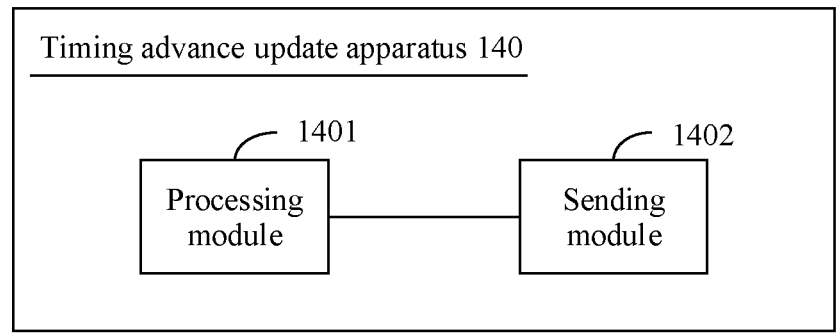
FIG. 14 is a schematic structural diagram of a timing advance update apparatus according to an embodiment of this application.

FIG. 14 is a schematic structural diagram of a timing advance update apparatus according 140 to an embodiment of this application. As shown in FIG. 14, the timing advance update apparatus 140 includes: a processing module 1401 configured to obtain a transmission delay variation and a candidate timing advance update amount of a terminal, where the transmission delay variation is a delay variation of transmission between the terminal and a network device, where the processing module 1401 is further configured to determine a timing advance update amount of the terminal based on the transmission delay variation, the candidate timing advance update amount, and a timing advance critical value, where the timing advance update amount is not greater than the timing advance critical value; and a sending module 1402 configured to send a timing advance command to the terminal, where the timing advance command indicates the timing advance update amount.

In a possible design, the processing module 1401 is further configured to: if a difference between the transmission delay variation and the candidate timing advance update amount is equal to the timing advance critical value, determine the candidate timing advance update amount as the timing advance update amount of the terminal.

In a possible design, the processing module 1401 is further configured to determine the transmission delay variation based on a correspondence between a transmission delay and an elevation angle.

In a possible design, the timing advance critical value is an integer multiple of a slot length.

In a possible design, the timing advance critical value is one slot, and a length of the timing advance command is 12 bits.

The timing advance update apparatus 140 provided in this embodiment of this application is configured to perform the method performed by the foregoing network device. An implementation principle and a technical effect of the timing advance update apparatus 140 are similar. Details are not described herein again in this embodiment.

Optionally, during hardware implementation, the processing module 1401 in this embodiment may be integrated into a processor for implementation, and the sending module 1402 may be integrated into a transmitter for implementation.

Figure 15:
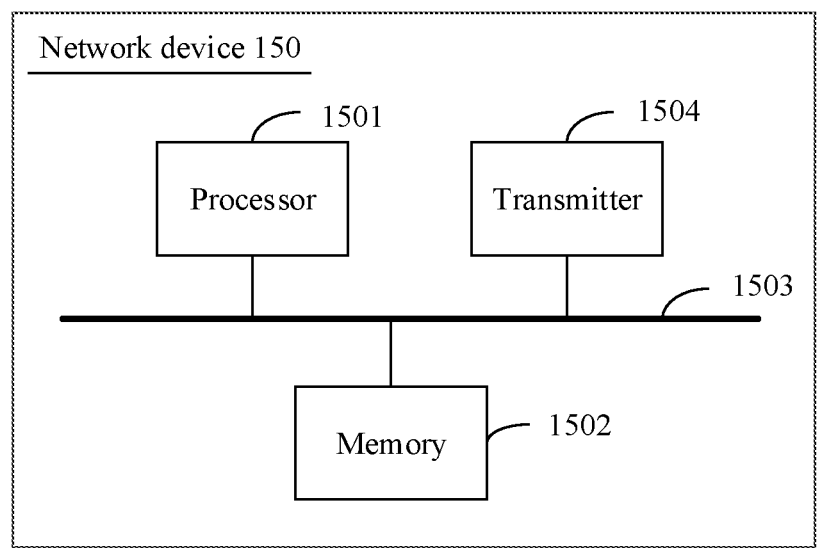
FIG. 15 is a schematic diagram of a hardware structure of a network device according to an embodiment of this application.

FIG. 15 is a schematic diagram of a hardware structure of a network device 150 according to an embodiment of this application. The network device 150 in this embodiment includes a processor 1501 and a memory 1502, where the memory 1502 is configured to store a computer program; and the processor 1501 is configured to execute the computer program stored in the memory 1502, to implement the steps performed by the network device 150 in the foregoing embodiment. For details, refer to related descriptions in the foregoing method embodiments.

Optionally, the memory 1502 may be independent, or may be integrated with the processor 1501.

When the memory 1502 is a device independent of the processor 1501, the network device 150 may further include a bus 1503 for connecting the memory 1502 and the processor 1501.

The network device 150 shown in FIG. 15 may further include a transmitter 1504 configured to send a timing advance command and the like.

The network device 150 provided in this embodiment may be configured to perform the method performed by the network device in the foregoing embodiment. An implementation principle and a technical effect of the network device 150 are similar to those of the foregoing embodiment. Details are not described herein again in this embodiment.

An embodiment of this application further provides a storage medium. The storage medium includes a computer program, and the computer program is used for implementing the method according to the first aspect or the possible designs of the first aspect.

An embodiment of this application further provides a computer program product. The computer program product includes computer program code, and when the computer program code is run on a computer, the computer is enabled to perform the method according to the first aspect or the possible designs of the first aspect.

An embodiment of this application further provides a chip, including a memory and a processor. The memory is configured to store a computer program, and the processor is configured to invoke the computer program from the memory and run the computer program, such that a communications device on which the chip is installed performs the method according to the first aspect or the possible designs of the first aspect.

An embodiment of this application further provides a storage medium. The storage medium includes a computer program, and the computer program is used for implementing the method according to the second aspect or the possible designs of the second aspect.

An embodiment of this application further provides a computer program product. The computer program product includes computer program code, and when the computer program code is run on a computer, the computer is enabled to perform the method according to the second aspect or the possible designs of the second aspect.

An embodiment of this application further provides a chip, including a memory and a processor. The memory is configured to store a computer program, and the processor is configured to invoke the computer program from the memory and run the computer program, such that a communications device on which the chip is installed performs the method according to the second aspect or the possible designs of the second aspect.

In the several embodiments provided in this application, it should be understood that the disclosed device and method may be implemented in other manners. For example, the described device embodiments are merely examples. For example, division into the modules is merely logical function division and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electric, mechanical, or other forms.

The modules described as separate parts may or may not be physically separate, and parts displayed as modules may or may not be physical units, may be located in one position, or may be distributed on a plurality of network units. Some or all of the modules may be selected based on actual needs to achieve the objectives of the solutions of the embodiments.

In addition, functional modules in the embodiments of this application may be integrated into one processing unit, or each of the modules may exist alone physically, or two or more modules are integrated into one unit. The unit integrated from the modules may be implemented in a form of hardware, or may be implemented in a form of hardware in addition to a software functional unit.

When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) or a processor to perform some of the steps of the methods described in the embodiments of this application.

It should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the methods disclosed with reference to this application may be directly performed and completed by a hardware processor, or performed and completed by a combination of hardware and a software module in the processor.

The memory may include a high-speed random access memory (RAM) memory, and may further include a non-volatile memory (NVM), for example, at least one magnetic disk storage, or may be a Universal Serial Bus (USB) flash drive, a removable hard disk, a read-only memory (ROM), a magnetic disk, an optical disc, or the like.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

The storage medium may be implemented by any type of volatile or nonvolatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium accessible to a general-purpose or dedicated computer.

For example, a storage medium is coupled to a processor, such that the processor can read information from the storage medium or write information into the storage medium. Certainly, the storage medium may alternatively be a component of the processor. The processor and the storage medium may be located in an ASIC. Certainly, the processor and the storage medium may alternatively exist in the device as discrete components.

What is claimed is:

1. A timing advance update method, comprising:
   obtaining, a transmission delay variation of transmission between a terminal and a network device, wherein the network device is a satellite, and wherein obtaining the transmission delay variation comprises calculating, by the satellite, the transmission delay variation based on a correspondence between a round-trip transmission delay and an elevation angle of the satellite;
   calculating, a new timing advance of the terminal based on the transmission delay variation, a current timing advance, and a timing advance critical value, wherein the new timing advance is not greater than the timing advance critical value, and wherein the timing advance critical value is an integer multiple of a slot length; and
   performing, uplink transmission based on the new timing advance.

2. The timing advance update method of claim 1, wherein calculating the new timing advance comprises:
   calculating, a candidate timing advance based on the transmission delay variation and the current timing advance; and
   calculating, the new timing advance based on the candidate timing advance and the timing advance critical value.

3. The timing advance update method of claim 2, wherein calculating the new timing advance comprises:
   calculating the new timing advance based on a difference between the candidate timing advance and the timing advance critical value in response to the candidate timing advance being greater than the timing advance critical value; or
   using the candidate timing advance as the new timing advance in response to the candidate timing advance not being greater than the timing advance critical value.

4. The timing advance update method of claim 1, wherein obtaining the transmission delay variation comprises:
   obtaining, a first receiving time of a current downlink signal and a second receiving time of a previous downlink signal, wherein the current downlink signal and the previous downlink signal comprise a downlink signal periodically sent by received from the network device; and
   calculating, the transmission delay variation based on the first receiving time, the second receiving time, and a sending periodicity of the downlink signal.

5. The timing advance update method of claim 1, further comprising:
   receiving, a timing advance command from the network device, wherein the timing advance command indicates a timing advance update amount, and wherein the timing advance update amount is not greater than the timing advance critical value; and
   calculating, the new timing advance based on the timing advance command and the current timing advance.

6. The timing advance update method of claim 1, wherein the timing advance critical value is a critical value in a time unit of a slot.

7. The timing advance update method of claim 4, wherein the downlink signal is one of a primary synchronization signal, a secondary synchronization signal, or a pilot signal.

8. A timing advance update method, comprising:
   obtaining, a transmission delay variation and a candidate timing advance update amount of a terminal, wherein the transmission delay variation is a delay variation of transmission between the terminal and a network device, wherein the network device is a satellite, and wherein obtaining the transmission delay variation comprises calculating, by the satellite, the transmission delay variation based on a correspondence between a round-trip transmission delay and an elevation angle of the satellite;

calculating, a timing advance update amount of the terminal based on the transmission delay variation, the candidate timing advance update amount, and a timing advance critical value, wherein the timing advance update amount is not greater than the timing advance critical value, and wherein the timing advance critical value is an integer multiple of a slot length; and sending, a timing advance command to the terminal, wherein the timing advance command indicates the timing advance update amount.

9. The timing advance update method of claim 8, wherein calculating the timing advance update amount of the terminal comprises setting the candidate timing advance update amount as the timing advance update amount of the terminal when a difference between the transmission delay variation and the candidate timing advance update amount is equal to the timing advance critical value.

10. The timing advance update method of claim 8, wherein the timing advance critical value is a critical value in a time unit of a slot.

11. A timing advance update apparatus, comprising:
a receiver configured to obtain a transmission delay variation, wherein the transmission delay variation is a delay variation of a transmission between a terminal and a network device, wherein the network device is a satellite, and wherein obtaining the transmission delay variation comprises calculating, by the satellite, the transmission delay variation based on a correspondence between a round-trip transmission delay and an elevation angle of the satellite;
a processor configured to calculate a new timing advance based on the transmission delay variation, a current timing advance, and a timing advance critical value, wherein the new timing advance of the terminal is not greater than the timing advance critical value, and wherein the timing advance critical value is an integer multiple of a slot length; and
a transmitter configured to perform uplink transmission based on the new timing advance.

12. The timing advance update apparatus of claim 11, wherein the processor is further configured to:
calculate a candidate timing advance based on the transmission delay variation and the current timing advance; and
calculate the new timing advance based on the candidate timing advance and the timing advance critical value.

13. The timing advance update apparatus of claim 12, wherein the processor is further configured to:
calculate the new timing advance based on a difference between the candidate timing advance and the timing advance critical value when the candidate timing advance is greater than the timing advance critical value; or
use the candidate timing advance as the new timing advance when the candidate timing advance is not greater than the timing advance critical value.

14. The timing advance update apparatus of claim 11, wherein the receiver is further configured to:
obtain a first receiving time of a current downlink signal and a second receiving time of a previous downlink signal, wherein the current downlink signal and the previous downlink signal comprise a downlink signal periodically received from the network device; and
calculate the transmission delay variation based on the first receiving time, the second receiving time, and a sending periodicity of the downlink signal.

15. The timing advance update apparatus of claim 11, wherein the receiver is further configured to receive a timing advance command from the network device, wherein the timing advance command indicates a timing advance update amount, wherein the timing advance update amount is not greater than the timing advance critical value, and wherein the processor is further configured to calculate the new timing advance based on the timing advance command and the current timing advance.

16. The timing advance update apparatus of claim 11, wherein the timing advance critical value is a critical value in a time unit of a slot.

17. The timing advance update apparatus of claim 14, wherein the downlink signal is one of a primary synchronization signal, a secondary synchronization signal, or a pilot signal.

* * * * *

UNITED STATES PATENT AND TRADEMARK OFFICE
CERTIFICATE OF CORRECTION

| | |
|---|---|
| PATENT NO. | : 12,035,267 B2 |
| APPLICATION NO. | : 17/390317 |
| DATED | : July 9, 2024 |
| INVENTOR(S) | : Peng Liu et al. |

It is certified that error appears in the above-identified patent and that said Letters Patent is hereby corrected as shown below:

In the Claims

Claim 4, Column 24, Line 42: "periodically sent by received from" should read "periodically received from"

Signed and Sealed this
Third Day of September, 2024

Katherine Kelly Vidal
*Director of the United States Patent and Trademark Office*